United States Patent [19]

Ono

[11] Patent Number: 4,697,927
[45] Date of Patent: Oct. 6, 1987

[54] METHOD AND APPARATUS FOR MEASURING A FORMING ERROR OF AN OBJECT

[75] Inventor: Akira Ono, Tokyo, Japan

[73] Assignee: Kabushiki Kaisha Toshiba, Kawasaki, Japan

[21] Appl. No.: 802,743

[22] Filed: Nov. 29, 1985

[51] Int. Cl.[4] .............................................. G01B 9/02
[52] U.S. Cl. .................................................. 356/360
[58] Field of Search ................ 356/359, 360; 364/525, 364/552

[56] References Cited

PUBLICATIONS

Balasubramanian et al, "A New Approach to High Precision Phase Measurement Interferometry", *Proc. SPIE*, vol. 230, pp. 180–190, 1980.

Akira Ono and J. C. Wyant, "Aspherical Mirror Testing Using a CGH with Small Errors", Applied Optics, vol. 24 (1985) 560.

T. Yatagai and T. Kanou, "Aspherical Surface Testing with Shearing Interferometer Using Fringe Scanning Detection Method", Optical Engineering, vol. 23 (1984) p. 357.

H. Bruning, et al "Digital Wavefront Measuring Interferometer for Testing Optical Surfaces and Lenses", Applied Optics, vol. 13 (1974) 2693.

*Primary Examiner*—Davis L. Willis
*Assistant Examiner*—Matthew W. Koren
*Attorney, Agent, or Firm*—Oblon, Fisher, Spivak, McClelland & Maier

[57] ABSTRACT

In a method of measuring the forming-error of an object with a shape which is optically smooth and can be expressed mathematically, the reflected light from the object and the reflected light from a reference mirror are made to interfere to form an interference fringe, and the forming error is calculated from the potential distribution of the interference fringe. This calculation of the forming error is performed by calculating the phase distribution $W(x,y)$ of a virtual object beam which is reflected from the measuring surface on the basis of the design values of the shape of the object to be measured when there is no forming error.

43 Claims, 12 Drawing Figures

METHOD AND APPARATUS FOR MEASURING A FORMING ERROR OF AN OBJECT

BACKGROUND OF THE INVENTION

The present invention relates to a method and apparatus for measuring the forming error of an object.

Some three-dimensional objects have complicated shapes, but have optically smooth surfaces and can be expressed by mathematically. Hitherto, the deviation of such a shape to a predetermined ideal shape to be formed (namely, forming error) is measured using a computer hologram method. In this method, in order to produce a hologram, a hologram figure is calculated by the computer from mathematical expressions representing the shape. An actual stereoscopic figure is drawn precisely on the basis of the hologram figure by a high-precision drawing apparatus such as an EB (electron beam) drawing apparatus. A laser beam is radiated onto the stereoscopic figure. The laser beam diffracted by the stereoscopic figure and the light reflected by the three-dimensional object overlap, so that an interference fringe is produced. The forming error of the three-dimensional object is measured from this interference fringe.

In this measuring method, a hologram must be produced and an expensive drawing apparatus is needed to produce the hologram.

There is another method of measuring the forming error of a three-dimensional object using a phase detecting system. Such a conventional method using the phase detecting system will be described with reference to FIG. 1.

A coherent light source 1, e.g., a laser generator generates a laser beam 2. The laser beam 2 enters a Michelson's interferometer 3. The interferometer 3 comprises a collimator lens 4, a half mirror 5, a condenser lens 8, and an image-forming lens 10. The laser beam 2 is enlarged to have a wider beam width and is converted to a parallel beam by the collimator lens 4. The laser beam 2 then enters the half mirror 5 at an angle of 45° to this parallel beam. The incident laser beam 2 is divided into two beams. One of the beams is deflected normally by the half mirror 5 and the other is transmitted straight through the half mirror 5. The deflected beam is projected through the condenser lens 8 onto the spherical plane of a spherical mirror 9 as an object to be measured and is reflected as an object beam 6 by the mirror 9. This object beam 6 is transmitted through the condenser lens 8, half mirror 5 and image-forming lens 10 and directed to an image sensor-monitor 11. The laser beam straightly transmitted through the half mirror 5 enters a reference mirror 12 arranged in the path of this laser beam and reflected by the mirror 12. The reflected laser beam is returned as a reference beam 7 to the half mirror 5 and is deflected thereby. This deflected laser beam is then transmitted through the image-forming lens 10 and directed to the sensor-monitor 11. The interference light caused due to interference between the object beam 6 and the reference beam 7 enters the image sensing section of the sensor-monitor 11. The interference light is converted to an electric signal by the sensor-monitor 11, so that an image of the interference fringe is derived on the image display screen.

When measuring the forming error of a spherical or plane mirror by an ordinary interferometer, the forming error is obtained on the basis of the straightness of the interference fringe. When it is intended to perform a measurement with higher precision, phase detection is carried out. As shown in FIG. 1, the reference mirror 12 is equipped with a driving apparatus 13. By driving the driving apparatus 13, the reference mirror 12 is minutely moved, thereby changing the phase of the reference beam 7. A drive controller 14 drives the driving apparatus 13 so that the phase of the reference beam 7 varies in four steps at $\pi/2$ at a step. A memory-data processor 15 is provided between the sensor-monitor 11 and the drive controller 14. The memory-data processor 15 receives the electric signal corresponding to the interference fringe from the sensor-monitor 11; converts to a digital signal, and stores this signal synchronously with each four-step change of the reference beam 7.

When the phase of the reference beam 7 is changed in four steps, the intensity distribution $I_N$ of the interference fringe which is input to the memory-data processor 15 is:

$$I_N(x,y) = I_0(x,y)\left[1 + \gamma\cos\left\{\psi(x,y) + \frac{\pi}{2}(N-1)\right\}\right] \quad (1)$$

$$N = 1, 2, 3, 4$$

$I_N(x,y)$: Intensity distribution of the interference fringe on the image display screen, namely, on the X-Y coordinate plane at the N-th change step.

$I_0(x,y)$: Intensity distribution of the laser beam, namely, the bias component of $I_N(x,y)$.

$\gamma$: Visibility of the interference fringe.

$\psi(x,y)$: Phase distribution or difference of the object beam which is caused due to the forming error of the spherical mirror 9 to be measured (measured in radians).

N : Ordinal number indicating the number of the change step of the phase of the reference beam 7. Namely, N is either one of integers 1 to 4.

In the above equation (1), it is assumed that the forming error is zero, that is, the spherical mirror 9 has an ideal sphere, and the $\psi(x, y)$ is constant. The $\psi(x,y)$ has a direct relation with the forming error, so the forming error can be obtained by determining $\psi(x,y)$. When an object to be measured is the spherical mirror 9 as in this example, the forming error $H(x,y)$ is expressed by:

$$H(x,y) = \psi(x,y) \times \frac{\lambda}{4\pi} + K$$

Where, $\lambda$ is a wavelength of the laser beam and K is a constant. The phase distribution $\psi(x,y)$ can be calculated by performing an arithmetic operation.

$$\psi(x,y) = \arctan\left(\frac{I_4(x,y) - I_2(x,y)}{I_1(x,y) - I_3(x,y)}\right)$$

$$= \arctan\frac{I_0(x,y)\gamma\left[\cos\left\{\psi(x,y) + \frac{3}{2}\pi\right\} - \cos\left\{\psi(x,y) + \frac{\pi}{2}\right\}\right]}{I_0(x,y)\gamma[\cos\{\psi(x,y)\} - \cos[\psi(x,y) + \pi]]}$$

$$= \arctan\frac{\sin\psi(x,y) - \{-\sin\psi(x,y)\}}{\cos\psi(x,y) - \{-\cos(x,y)\}}$$

-continued $$= \arctan \frac{\sin\psi(x,y)}{\cos\psi(x,y)}$$

By calculating $$H(x,y) = \psi(x,y) \times \frac{\lambda}{4\pi} \times K$$

using the calculated ψ(x,y), the forming error H(x,y) can be derived. The above-mentioned arithmetic operations for obtaining the H(x,y) and ψ(x,y) are executed by the memory-data processor 15.

According to this measuring method using the phase detecting system which has been described with reference to FIG. 1, the forming error of any planes and spheres can be very accurately measured. However, in the case of complicated objects, a measurement error is caused because the intensity distribution of the interference fringe deviates from the sine function. When an object to be measured is a complicated object, the difference between the measured value and the ideal value is obtained in order to measure the forming error. Furthermore, the error component based on the position and posture of the object is removed. Thus, the number of operations is increased, resulting in very low operating efficiency. On the other hand, in the case of a deep object, the interval of the interference fringe which is formed on the image displaying screen of the sensor-monitor 11 becomes narrow, so that the result of the measurement is influenced by the size of one pixel on the image displaying screen.

A measuring method by way of moire topography has been known as still another measuring methqd. This measuring method will be described with reference to FIG. 2. A laser beam 2 radiated from a laser generator 1 serving as a coherent light source is transmitted through a lattice 3A and enters a measuring object 9 whose forming error is to be measured. The beam light reflected by the measuring object 9 is again transmitted through the lattice 3A and enters a sensor-monitor 11. In this case, a fringe pattern image as shown in FIG. 3 appears on the display screen of the sensor-monitor 11. In the image shown in FIG. 3 curved fringes 9' are moire contour lines showing the shape of the object 9 and straight fringes 3A' indicate the lattice image. Only the curved moire contour lines 9' are needed to measure the forming error and the straight fringes 3A' become noise. A driver 13 is provided for the lattice 3 to erase the straight fringes 3A' as the noise. The lattice 3A is repeatedly moved by the driver 13 in the directions indicated by the arrows. In this case, the moire contour lines 9' do not move but the straight fringes 3A' move on the display screen. If the image on the display screen is observed for a long time, the straight fringes 3A' will be averaged and eventually erased. In other words, the noise component is removed, so that only the moire contour lines 9' remain as shown in FIG. 4 and the forming errors can be measured with a high degree of accuracy.

According to the conventional measuring method described in conjunction with FIG. 2, a hologram of the object to be measured has to be made, so that an expensive drawing apparatus or EB drawing apparatus has to be used.

SUMMARY OF THE INVENTION

The present invention has been made in consideration of the above-mentioned circumstances. It is an object of the invention to provide a method and apparatus based on the phase detecting system for measuring the forming error of a complicated object which has optically smooth surfaces and whose shape can be expressed by mathematically. Even when the intensity distribution of the interference fringe cannot be expressed by sine functions, the forming error can be obtained with a high degree of precision, and the measurement precision is not influenced by the size of one pixel on the image sensing section. The influences of the position and posture of the object to be measured can also be eliminated.

According to the invention, there is provided a method of measuring a forming error of an object to be measured comprising the steps of:

(a) generating a coherent light beam;

(b) making a beam of said coherent light beam which is reflected from a reference surface as a reference beam interfere with a beam reflected from a measuring surface of said measuring object as an object beam, thereby producing an interference fringe;

(c) measuring a phase difference between said reflected beam and said object beam based on the derived interference fringe;

(d) determining a forming value of said measuring surface based on the measured phase difference; and (e) determining the forming error of said measuring surface from said forming values derived from the measuring surface.

According to the invention, there is provided a method of measuring a forming error of an object to be measured comprising the steps of:

(a) projecting a coherent light beam;

(b) making a light of said coherent light beam which is reflected from a reference surface as a reference interfere with a light, as an object beam, from a measuring surface of the object whose forming error is measured, thereby obtaining an interference light of said reflected light;

(c) determining an intensity distribution of an interference fringe based on said interference light; and (d) calculating a forming error of said measuring surface of said object to be measured based on said intensity distribution, this calculating step including the procedures of:

relatively changing a phase difference ψ(x,y) of said reflected light, storing on an X-Y coordinate plane intensity distributions of said interference light which are respectively obtained when said phase difference ψ(x,y) is changed to $$\psi(x,y), \psi(x,y) + \frac{\pi}{2}, \psi(x,y) + \pi, \text{ and } \psi(x,y) + \frac{3}{2\pi}$$

as intensity distributions $E_1(X,Y)$, $E_2(X,Y)$, $E_3(X,Y)$, and $E_4(X,Y)$, calculating a phase distribution W(x,y) of a virtual object beam which is reflected from said measuring surface on the basis of design values of the shape of said measuring surface when there is no forming error, calculating $$C(X,Y) = \int_{Y-\frac{b}{2}}^{Y+\frac{b}{2}} \int_{X-\frac{a}{2}}^{X+\frac{a}{2}} f(x-X, y-Y) \cdot \cos W(x,y) dx dy$$

$$S(X,Y) = \int_{Y-\frac{b}{2}}^{Y+\frac{b}{2}} \int_{X+\frac{a}{2}}^{X+\frac{a}{2}} f(x-X, y-Y) \cdot \sin W(x,y) dx dy$$

when it is assumed that an intensity distribution in a pixel at a (X,Y) coordinate position is f(x−X, y−Y) and a size of said pixel is "a" in the x direction and "b" in the y direction, calculating the phase difference $\psi(X,Y)$ at said (X,Y) coordinate position by calculating $$E(X,Y) = \frac{C(X,Y)\{E_4(X,Y) - E_2(X,Y)\} - S(X,Y)\{E_1(X,Y) - E_3(X,Y)\}}{C(X,Y)\{E_1(X,Y) - E_3(X,Y)\} + S(X,Y)\{E_4(X,Y) - E_2(X,Y)\}}$$

and $$\arctan\{E(C,Y)\} = \psi(X,Y),$$

and calculating the forming error of said object on the basis that there is a linear relation between said phase difference $\psi(X,Y)$ and the forming error of said object to be measured at said (X,Y) coordinate position.

According to the invention, there is further provided an apparatus for measuring a forming error of an object to be measured comprising:

(a) means for projecting a coherent light beam;

(b) making a light of said coherent light beam which is reflected from a reference surface as a reference beam interfere with a light reflected as an object beam from a measuring surface of the object whose forming error is measured, thereby obtaining an interference light of said reflected light;

(c) means for changing said interference light into an electric signal and providing an intensity distribution of an interference fringe based on said interference light; and (d) means for calculating a forming error of said measuring surface of said object to be measured based on said intensity distribution, said calculating means comprising:

means for relatively changing a phase difference $\psi(x,y)$ of said reflected light, means for storing on an X-Y coordinate plane intensity distributions of said interference light which are respectively obtained when said phase difference $\psi(x,y)$ is changed to $$\psi(x,y), \psi(x,y) + \frac{\pi}{2}, \psi(x,y) + \pi, \text{ and } \psi(x,y) + \frac{3}{2\pi}$$

as intensity distributions $E_1(X,Y)$, $E_2(X,Y)$, $E_3(X,Y)$, and $E_4(X,Y)$, means for calculating a phase distribution W(x,y) of a virtual object beam which is reflected from said measuring surface on the basis of designing values of a virtual object beam which is reflected from said measuring surface on the basis of design values of the shape of said measuring surface when there is no forming error, means for calculating $$C(X,Y) = \int_{Y-\frac{b}{2}}^{Y+\frac{b}{2}} \int_{X-\frac{a}{2}}^{X+\frac{a}{2}} f(x-X, y-Y) \cdot \cos W(x,y) dx dy$$

$$S(X,Y) = \int_{Y-\frac{b}{2}}^{Y+\frac{b}{2}} \int_{X+\frac{a}{2}}^{X+\frac{a}{2}} f(x-X, y-Y) \cdot \sin W(x,y) dx dy$$

when it is assumed that an intensity distribution in a pixel at a $\psi(X,Y)$ coordinate position is f(x−X, y−Y) and a size of said pixel is a in the x direction and b in the y direction, means for calculating the phase difference $\psi(X,Y)$ at said (X,Y) coordinate position by calculating $$E(X,Y) = \frac{C(X,Y)\{E_4(X,Y) - E_2(X,Y)\} - S(X,Y)\{E_1(X,Y) - E_3(X,Y)\}}{C(X,Y)\{E_1(X,Y) - E_3(X,Y)\} + S(X,Y)\{E_4(X,Y) - E_2(X,Y)\}}$$

and $$\arctan\{E(X,Y)\} = \psi(X,Y),$$

and means for calculating the forming errors of said object to be measured on the basis that there is a linear relation between said phase difference $\psi(X,Y)$ and said forming errors of said object to be measured at said (X,Y) coordinate position.

According to the invention, there is further provided a method of measuring a shape of an object to be measured comprising the steps of:

(a) generating a coherent light beam;

(b) making a beam of said coherent light beam which is reflected from a reference surface as a reference beam interfere with a beam reflected, as an object beam, from a measuring surface of said measuring object thereby producing an interference fringe;

(c) measuring a first phase difference between said reflected beam and said object beam based on the derived interference fringe;

(d) determining a second phase difference between a virtual object beam and a virtual reference beam when it is assumed that said measuring surface has ideal design forming values; and (e) obtaining the forming error of said measuring surface from said first and second phase differences.

According to the invention, there is still further provided a method of measuring a shape of an object to be measured comprising the steps of:

(a) generating a coherent light beam;

(b) making a beam of said coherent light beam which reflected from a reference surface as a reference beam interfere with a beam reflected, as an object beam, from a measuring surface of said measuring object, thereby producing an actual interference fringe;

(c) changing a phase difference between said object beam and said reflected beam in N stages at $\psi$ at a step and storing an actual image signal at each of said N stages (N is an integer of 2 or more);

(d) obtaining virtual interference fringes which are obtained in the case where it is assumed that said measuring surface has ideal design forming values and that a phase difference between a virtual object beam and a virtual reference beam is changed in N stages by $\psi$ at a time; and (e) measuring the forming error of said measuring surface on the basis of said actual interference fringe and said virtual interference fringe, said measuring step including the following procedures:

storing a virtual image signal at each stage of the change of the phase differences of said N stages when obtaining said virtual interference fringe, sequentially reading said virtual image signal at each stored stage, performing said change of said phase difference between said object beam and said reference beam in synchronism with said sequential reading, calculating a sum, product, difference, or quotient of said virtual image signal read out and said actual image signal, and displaying an image on the basis of the result of said calculation and measuring the forming error of said measuring surface of said object to be measured from a linearity of said image.

According to the invention, there is further provided an apparatus for measuring a forming error of an object to be measured comprising:

(a) means for generating a coherent light beam;

(b) reference means;

(c) means for making a beam of said coherent light beam which is reflected from a reference surface of said reference means as a reference beam interfere with a beam reflected, as an object beam, from a measuring surface of said measuring object;

(d) means for providing an actual interference fringe;

(e) arithmetic means for obtaining virtual interference fringes when a phase difference between a virtual object beam from a virtual object and a virtual reference beam is changed to N stages by $\psi$ at a time when it is assumed that said measuring surface has ideal design forming values;

memory means for storing a virtual image signal at each of said N stages of said virtual interference fringes derived by said arithmetic means;

reading means for sequentially reading out the virtual image signal at each of said N stages from said memory means;

driving means for changing a phase of said reflected beam from said reference means by driving the reference means;

means for controlling said driving means so as to change the phase of said reflected beam from said reference beam in N stages at $\psi$ at a time in synchronism with the readout of said virtual image signal by said reading means;

signal processing means for calculating a sum, product, difference, or quotient of said virtual image signal from said readout means and the image signal of said actual interference fringe; and means for displaying an image on the basis of an output from said signal processing means and measuring the forming errors of said measuring surface of said object to be measured from a linearity of said image displayed.

DETAILED DESCRIPTION OF THE PREFERRED EMBODIMENTS

A measuring method and a measuring apparatus according to an embodiment of the present invention will now be described with reference to FIGS. 5 to 7.

Figure 1:
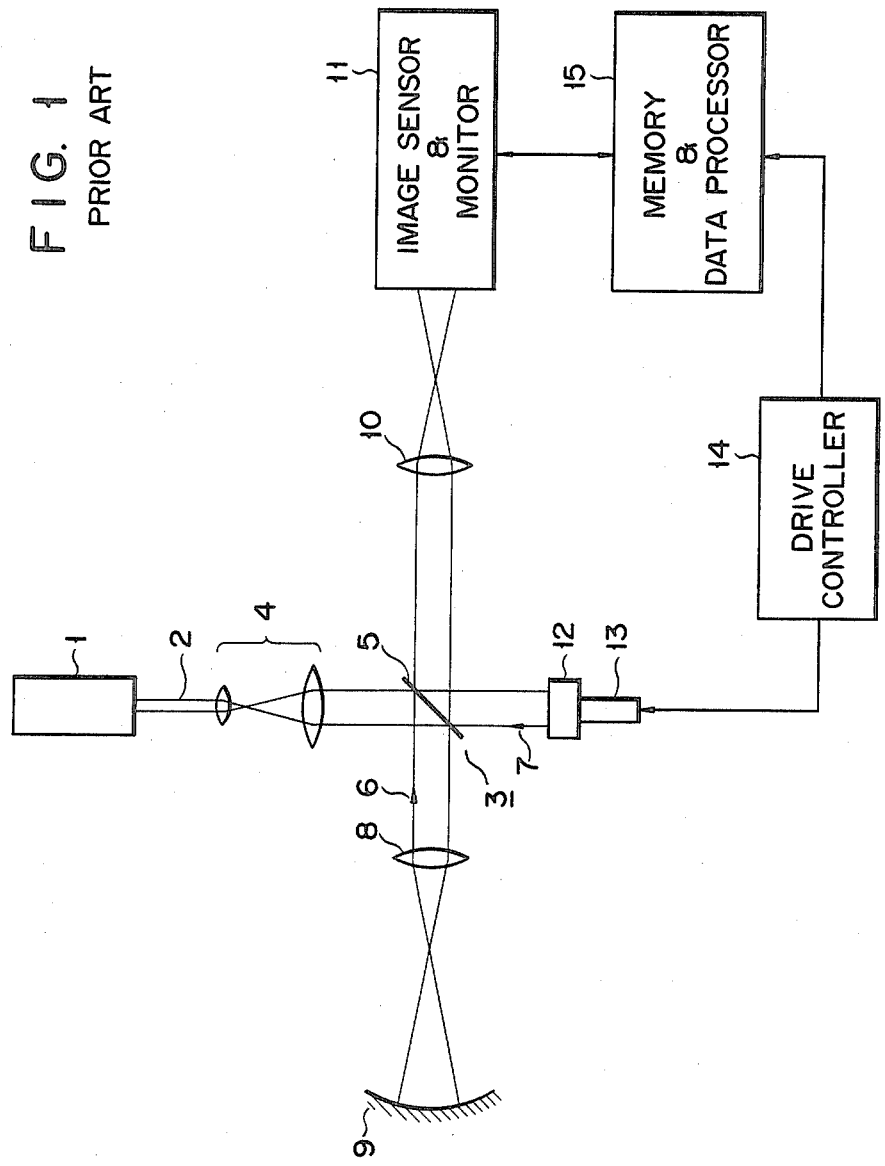
FIG. 1 is a diagram schematically showing an arrangement of an apparatus for measuring the forming error of an object using a phase detecting system.
Figure 2:
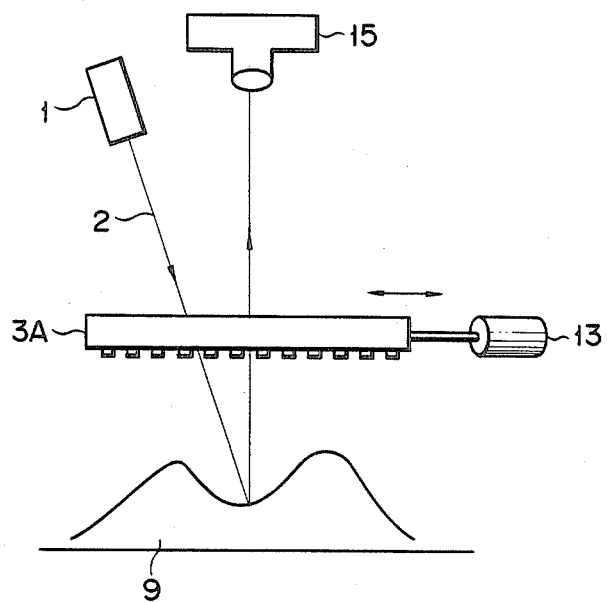
FIG. 2 is a schematic of another conventional measuring apparatus.
Figure 3:
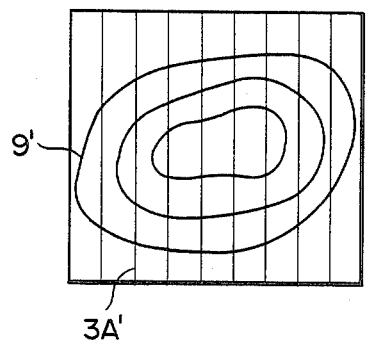
FIGS. 3 and 4 are diagrams showing the moire fringes derived by the measuring apparatus of FIG. 2.
Figure 4:
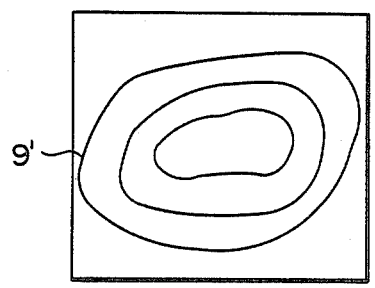
Figure 5:
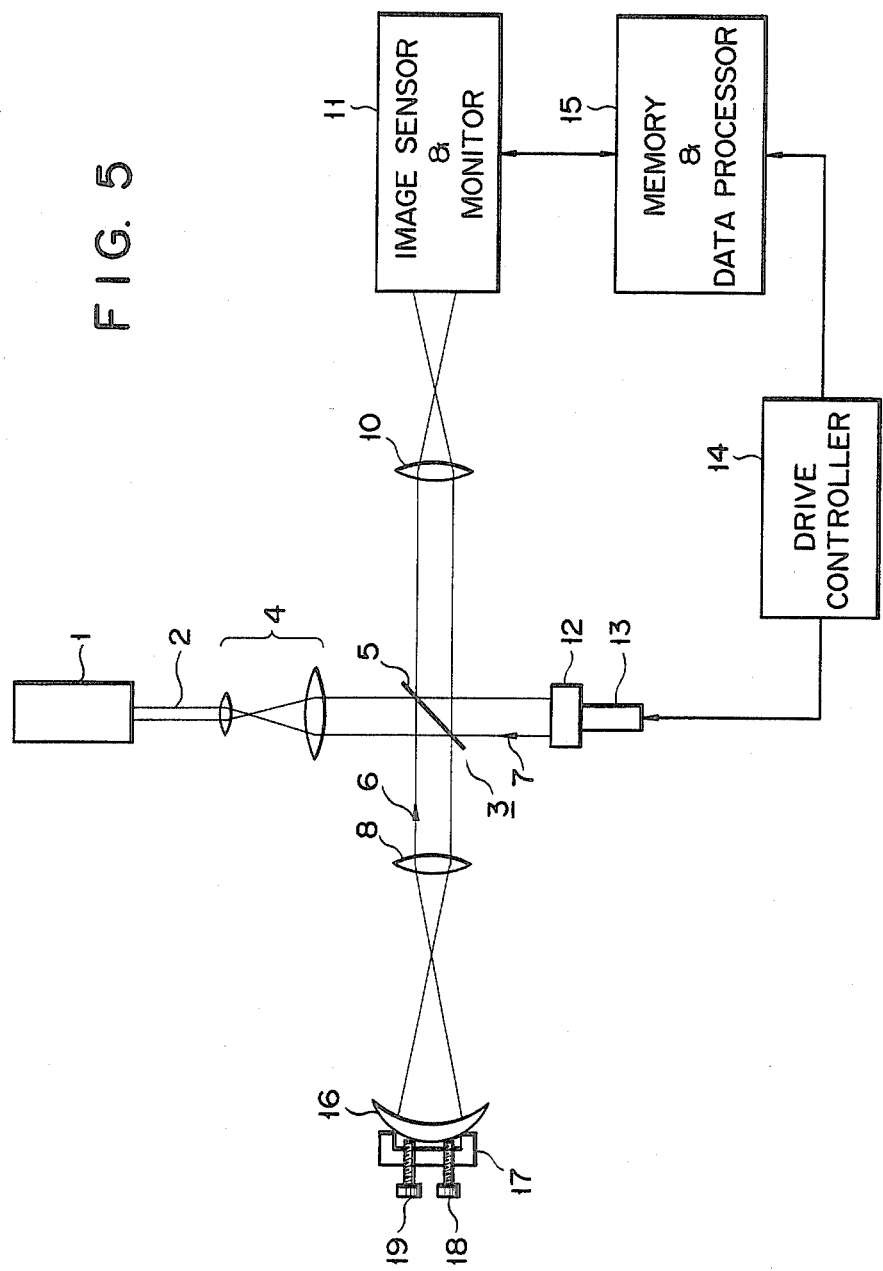
FIG. 5 is a diagram schematically showing an arrangement of a measuring apparatus according to an embodiment of the present invention for measuring the forming error of an object using the phase detecting system.
Figure 6:
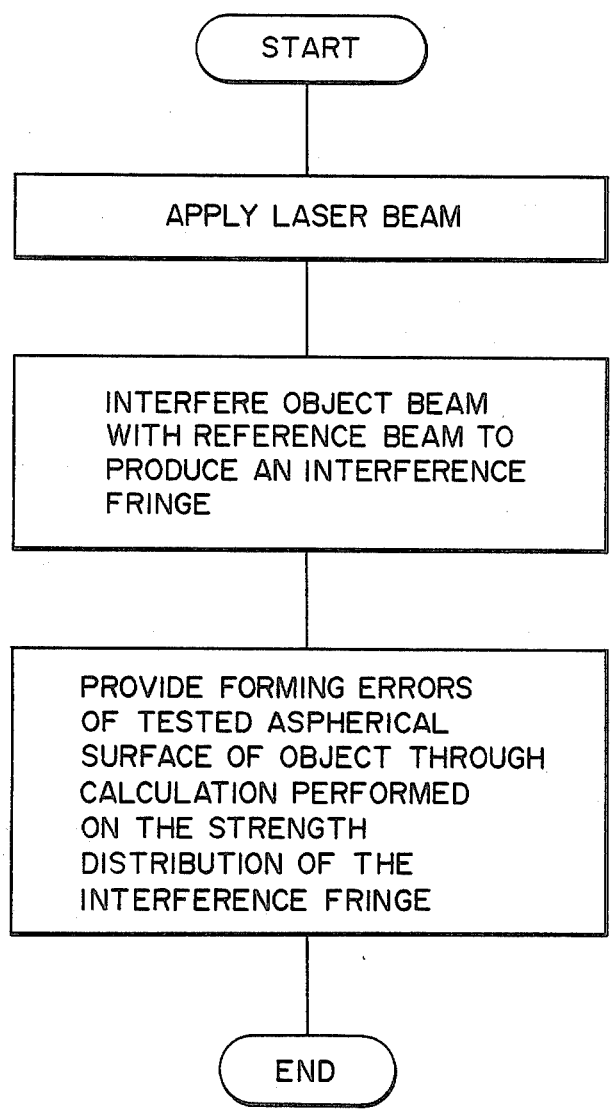
FIG. 6 is a flow chart showing a measuring method which is executed by the measuring apparatus shown in FIG. 5.

FIG. 5 is a diagram schematically showing a measuring apparatus, in which the same parts and components as those in the conventional measuring apparatus shown in FIG. 1 are designated by the same reference numerals. The measuring apparatus shown in FIG. 5 is substantially the same as the conventional measuring apparatus shown in FIG. 1 excluding that the arithmetic operation in the memory-data processor 15 differs from that in the apparatus of FIG. 1. Although a spherical object was used to measure the forming error in FIG. 1, an aspherical object is used in FIG. 5.

The coherent light source 1, for example, a laser generator generates a coherent beam. The laser beam generated from the laser generator 1 enters the Michelson's interferometer 3 arranged on the path of the laser beam. The interferometer 3 comprises the collimator lens 4, the half mirror 5, the condenser lens 8, and the image-forming lens 10. The laser beam entered the collimator lens 4 is enlarged to have a wider beam width and is converted to the parallel beam. The half mirror 5 is arranged on the path of the parallel beam with an angle of about 45°. The parallel beam enters the half mirror 5. The half mirror 5 separates the incident laser beam into the deflected laser beam which progresses in the direction normal to the progressing direction of the parallel beam and the straight laser beam which progresses in the straight direction. The deflected laser beam is transmitted through the condenser lens 8 arranged in the progressing direction of this deflected laser beam and is projected onto an aspherical mirror 16 as an object to be measured which is arranged forward in this progressing direction. Then, the deflected laser beam is reflected by the mirror 16. The reflected beam is returned as the object beam 6 to the condenser lens 8 and converted to the parallel beam and transmitted through the half mirror 5. Thereafter, this parallel beam is directed to the sensor-monitor 11 through the image-forming lens 10 arranged on the paths of the parallel beam. On one hand, the laser beam which was transmitted through the half mirror 5 and progressed straight is projected onto the reference mirror 12 arranged in the progressing direction of this laser beam and is reflected by the mirror 12. The reflected laser beam is returned as the reference beam 7 to the half mirror 5 and deflected thereby and directed to the sensor-monitor 11 through the image-forming lens 10. The condenser lens 8 serves to deflect the incident laser beam such that it is projected perpendicularly to the aspherical mirror 16. The image-forming lens 10 deflects the object beam 6 and reference beam 7 and allows these beams to be directed onto the image sensing section of the sensor-monitor 11. The object beam 6 and reference beam 7 are made interfere due to the interferometer 3, so that the interference fringe due to the interference of the object and reference beams 6 and 7 is formed on the image display screen of the sensor-monitor 11. The aspherical mirror 16 is held at a predetermined position by a holding device 17, and the position of the mirror 16 can be adjusted by screw members 18 and 19 attached to the holding device 17. In this embodiment, the present invention is applied to the measurement of the forming errors of the aspherical mirror 16. However, the invention can be also applied to a measurement of the forming errors of a plane mirror. In such a case, the condenser lens 8 is unnecessary. Also in such a case, the laser beam which was deflected by the half mirror 5 and was directed to the plane mirror is directly projected onto the plane mirror and returned to the half mirror 5 as the parallel beam.

Referring to the apparatus of FIG. 5, the driving apparatus 13 is arranged under the reference mirror 12. By driving the driving apparatus 13, the reference mirror 12 is minutely moved, thereby changing the phase of the reference beam 7. The drive controller 14 drives the driving apparatus 13 such that the phase of the reference beam 7 varies in four steps at $\pi/2$ at a time. The memory-processor 15 is arranged between the sensor-monitor 11 and the drive controller 14. The memory-processor 15 receives an image of the interference fringe formed on the sensor-monitor 11, converts to a digital signal, and stores it synchronously with each change in four steps of the phase of the reference beam 7.

When the phase of the reference beam 7 is changed in four steps, the intensity distribution of the interference fringe which is input to the memory-data processor 15 becomes:

$$I_N(x,y) = I_0(x,y)\left[1 + a\cos\left\{W(x,y) + \psi(x,y) + \frac{\pi}{2}(N-1)\right\}\right] \quad (3)$$

$I_N(x,y)$: Intensity distribution of the interference fringe on the image display screen, namely, on the X-Y coordinate plane at the N-th change step.
$I_0(x,y)$: Intensity distribution of the laser beam, namely, the bias component of the $I_N(x,y)$.
$\gamma$: Visibility of the interference fringe.
$\alpha(x,y)$: Phase distribution of the object beam which is caused due to the forming error of the aspherical mirror 16 as an object to be measured (the unit is radian).
N : Ordinal number indicating which number the change step of the phase of the reference beam 7 is. Namely, N is either one of integers 1 to 4.

In the above equation (3), W(x,y) denotes a phase distribution of the object beam 6 when the forming error of the aspherical mirror 16 to be measured are zero. The phase distribution W(x,y) can be calculated from the designing values of the aspherical mirror 16.

Assuming that the size of one pixel on the image display screen as the X-Y coordinate plane is "a" in the X direction and "b" in the Y direction and the coordinate position of the center of the pixel is (X, Y), the intensity of luminance $E_N(X,Y)$ of the pixel is expressed by:

$$E_N(X,Y) = \int_{Y-\frac{b}{2}}^{Y+\frac{b}{2}} \int_{X-\frac{a}{2}}^{X+\frac{a}{2}} f(x-X, y-Y)I_N(x,y)dxdy \quad (4)$$

where, $f(x-X, y-Y)$ is a function which gives the shape of one pixel and the photo sensitivity distribution. (X,Y) denotes coordinates of the central position of the pixel and (x,y) indicates coordinates of an arbitrary position on the X-Y coordinate plane. An ITV camera, CCD array camera, image dissector camera, photo array sensor, or the like can be used as the sensor-monitor 11. In the case of the CCD array camera or photo array sensor, the photo sensitivity of the whole area of the photo sensitive surface is uniform and the shape of the pixel is rectangular; therefore, the luminance intensity $E_N(X,Y)$ will not be substantially influenced even if the term $f(x-X, y-Y)$ is omitted from equation (4).

When equation (4) is developed by substituting equation (3) for equation (4), we have $$E_N(X,Y) = \int_{Y-\frac{b}{2}}^{Y+\frac{b}{2}} \int_{X-\frac{a}{2}}^{X+\frac{a}{2}} I_0(x,y)\left[f(x-X, y-Y) + \right. \quad (5)$$

$$\left. \gamma f(x-X, y-Y)\cos\left\{W(x,y) + \psi(x,y) + \frac{\pi}{2}(N-1)\right\}\right] dxdy$$

$$= \int_{Y-\frac{b}{2}}^{Y+\frac{b}{2}} \int_{X-\frac{a}{2}}^{X+\frac{a}{2}} I_0(x,y)\left[f(x-X, y-Y) + \right.$$

$$\gamma f(x-X, y-Y)\left(\cos W(x,y)\cos\left(\psi(x,y) + \frac{\pi}{2}(N-1)\right) - \right.$$

$$\left.\left. \sin W(x,y)\sin\left(\psi(x,y) + \frac{\pi}{2}(N-1)\right)\right)\right] dxdy$$

The size of one pixel is enough small to the entire image sensing surface, generally, one of hundreds to the entire image sensing surface. The intensity distribution $I_0(x,y)$ of the laser beam and the phase distribution $\psi(x,y)$ which is caused due to the forming error gradually change. Thus, the $I_0(x,y)$ and $\psi(x,y)$ in one pixel are considered to be uniform and may be omitted from equation (5). That is, we have $$E_N(X,Y) = I_0(x,y) \int_{Y-\frac{b}{2}}^{Y+\frac{b}{2}} \int_{X-\frac{a}{2}}^{X+\frac{a}{2}} f(x-X, y-Y)dxdy + I_0(x,y) \cdot \gamma \cdot \cos\left( \psi(x,y) + \right.$$

$$\left. \frac{\pi}{2}(N-1) \right) \int_{Y-\frac{b}{2}}^{Y+\frac{b}{2}} \int_{X-\frac{a}{2}}^{X+\frac{a}{2}} f(x-X, y-Y)\cos W(x,y)dx - I_0(x,y) \cdot \gamma \cdot \sin\left( \psi(x,y) + \right.$$

$$\left. \frac{\pi}{2}(N-1) \right) \int_{Y-\frac{b}{2}}^{Y+\frac{b}{2}} \int_{X-\frac{a}{2}}^{X+\frac{a}{2}} f(x-X, y-Y)\sin W(x,y)dxdy \qquad (6)$$

When it is defined as follows, $$\left. \begin{array}{l} \int_{Y-\frac{b}{2}}^{Y+\frac{b}{2}} \int_{X-\frac{a}{2}}^{X+\frac{a}{2}} f(x-X, y-Y)\cos W(x,y)dxdy = C(X,Y) \\ \\ \int_{Y-\frac{b}{2}}^{Y+\frac{b}{2}} \int_{X-\frac{a}{2}}^{X+\frac{a}{2}} f(x-X, y-Y)\sin W(x,y)dxdy = S(X,Y) \end{array} \right\} \qquad (7)$$

equation (6) can be rewritten as the following equation (8).

$$E_N(X,Y) = \qquad (8)$$

$$I_0(x,y) \int_{Y-\frac{b}{2}}^{Y+\frac{b}{2}} \int_{X-\frac{a}{2}}^{X+\frac{a}{2}} f(x-X, y-Y)dxdy + C(X,Y) \cdot$$

$$I_0(X,Y) \cdot \gamma \cdot \cos\left( \psi(X,Y) + \frac{\pi}{2}(N-1) \right) - S(X,Y) \cdot I_0(X,Y) \cdot$$

$$\gamma \cdot \sin\left( \psi(X,Y) + \frac{\pi}{2}(N-1) \right)$$

When $N = 1$, \qquad (9)

$$\cos\left( \psi(x,y) + \frac{\pi}{2}(N-1) \right) = \cos\psi(x,y)$$

$$\sin\left( \psi(x,y) + \frac{\pi}{2}(N-1) \right) = \sin\psi(x,y)$$

When $N = 2$, $$\cos\left( \psi(x,y) + \frac{\pi}{2}(N-1) \right) =$$

$$\cos\left( \psi(x,y) + \frac{\pi}{2} \right) = -\sin\psi(x,y)$$

$$\sin\left( \psi(x,y) + \frac{\pi}{2}(N-1) \right) =$$

$$\sin\left( \psi(x,y) + \frac{\pi}{2} \right) = \cos\psi(x,y)$$

When $N = 3$, $$\cos\left( \psi(x,y) + \frac{\pi}{2}(N-1) \right) = \cos\{\psi(x,y) + \pi\} = -\cos\psi(x,y)$$

$$\sin\left( \psi(x,y) + \frac{\pi}{2}(N-1) \right) = \sin\{\psi(x,y) + \pi\} = -\sin\psi(x,y)$$

When $N = 4$, $$\cos\left( \psi(x,y) + \frac{\pi}{2}(N-1) \right) =$$

$$\cos\left( \psi(x,y) + \frac{3}{2}\pi \right) = \sin\psi(x,y)$$

$$\sin\left( \psi(x,y) + \frac{\pi}{2}(N-1) \right) =$$

$$\sin\left( \psi(x,y) + \frac{3}{2}\pi \right) = -\cos\psi(x,y)$$

By calculating $E_A = E_1(X,Y) - E_3(X,Y)$ using equations (8) and (9), we have $$E_A = E_1(X,Y) - E_3(X,Y) = 2I_0(X,Y)\gamma\{C(X,Y)\cos\psi(X,Y) - S(X,Y)\sin\psi(X,Y)\} \qquad (10)$$

Similarly, by calculating $E_B = E_4(X,Y) - E_2(X,Y)$ using equations (8) and (9), we have $$E_B = E_4(X,Y) - E_2(X,Y) = 2I_0(X,Y)\gamma\{S(X,Y)\cos\psi(X,Y) + C(X,Y)\sin\psi(X,Y)\} \qquad (11)$$

By calculating $$E(X,Y) = \frac{C(X,Y)E_B - S(X,Y)E_A}{C(X,Y)E_A + S(X,Y)E_B}$$

using equations (10) and (11), we have $$E(X,Y) = \frac{C(X,Y)E_B - S(X,Y)E_A}{C(X,Y)E_A + S(X,Y)E_B} \quad (12)$$

$$= \frac{2I_0(X,Y)\gamma\{C(X,Y)^2\sin\psi(X,Y) + C(X,Y) \cdot S(X,Y)\cos\psi(X,Y)}{2I_0(X,Y)\gamma\{C(X,Y)^2\cos\psi(X,Y) - C(X,Y) \cdot S(X,Y)\sin\psi(X,Y)}$$

$$\frac{-C(X,Y) \cdot S(X,Y)\cos\psi(X,Y) + S(X,Y)^2\sin\psi(X,Y)\}}{+ C(X,Y) \cdot S(X,Y)\sin\psi(X,Y) + S(X,Y)^2\cos\psi(X,Y)\}}$$

$$= \frac{\{C(X,Y)^2 + S(X,Y)^2\}\sin\psi(X,Y)}{\{X(C,Y)^2 + S(X,Y)^2\}\cos\psi(X,Y)}$$

$$= \frac{\sin\psi(X,Y)}{\cos\psi(X,Y)}$$

From equation (12), the $\psi(X,Y)$ is expressed by $$\psi(X,Y) = \arctan E(X,Y) = \arctan\frac{\sin\psi(X,Y)}{\cos\psi(X,Y)} \quad (13)$$

Figure 7:
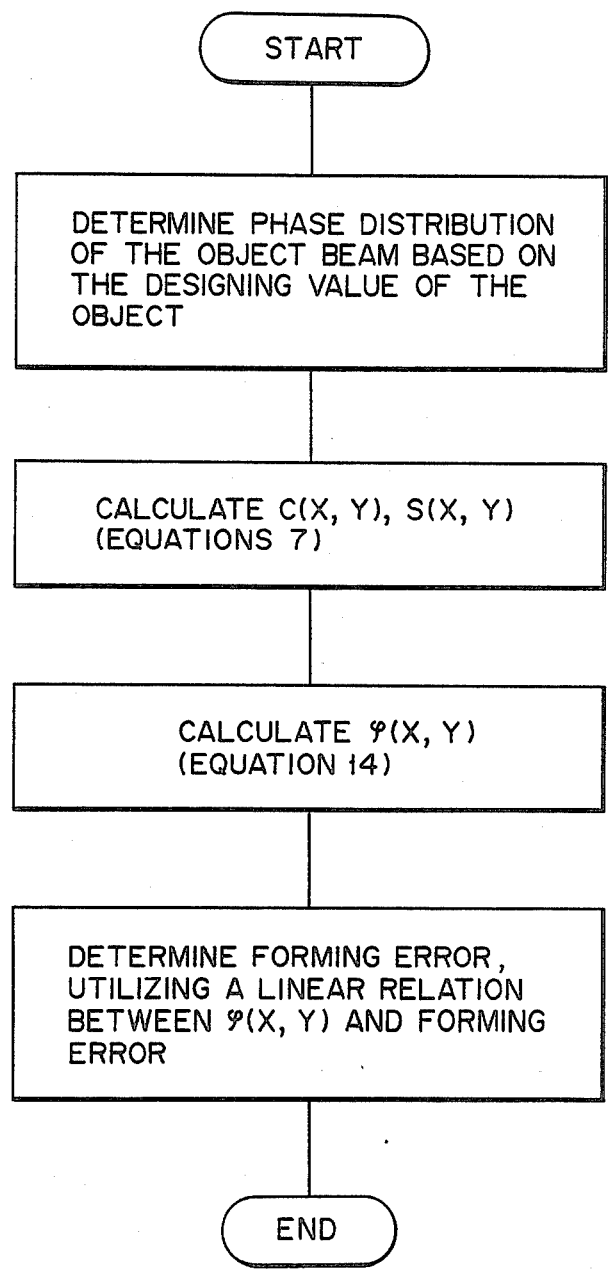
FIG. 7 is a flow chart for the arithmetic operating procedure used in the measuring method of the invention.

In brief, the phase distribution $\psi(X,Y)$ of the object beam 6 which is caused due to the forming error is obtained by the following calculating procedure (FIG. 7).

(1) It is assumed that an object to be measured, i.e., the aspherical mirror 16 in this case does not have any forming error. Then, the virtual phase distribution $W(x,y)$ of the object beam 6 reflected by the aspherical mirror 16 is obtained from a designing shape.

(2) By calculating equation (7), $C(X,Y)$ and $S(X,Y)$ in each pixel are calculated.

(3) $\psi(X,Y)$ is obtained by operating the following equation (14) derived from equations (12) and (13).

$$\psi(X,Y) = \arctan \quad (14)$$

$$\frac{C(X,Y)\{E_4(X,Y) - E_2(X,Y)\} - S(X,Y)\{E_1(X,Y) - E_3(X,Y)\}}{C(X,Y)\{E_1(X,Y) - E_3(X,Y)\} + S(X,Y)\{E_4(X,Y) - E_2(X,Y)\}}$$

Consideration will then be made with respect to the case where the position and attitude of the object are deviated. It is now assumed that the deviation amounts are $\Delta x$ and $\Delta y$ in the x and y directions, a coefficient of the phase distortion of the object beam 6 due to the deviation in the direction of optical axis (Z direction) is $\alpha$, a coefficient of the phase distortion of the object beam 6 due to the gradient around the y axis is $T_1$ and a coefficient around the x axis is $T_2$.

Assuming that the distribution of the phase distortion of the object beam 6 due to the deviations of the position and attitude of the object is integrally $W_e(x,y)$, it can be expressed by the following equation.

$$W_e(x,y) = \alpha \cdot \{(x-\Delta x)^2 + (y-\Delta y)^2\} + T_1 \cdot (x-\Delta x) + T_2 \cdot (y-\Delta y) \quad (15)$$

In this case, the intensity distribution $I_N(x,y)$ of the interference fringe is expressed as follows from equation (3).

$$I_N(x,y) = I_0(x,y)\left[1 + \alpha\cos\left\{W(x-\Delta x, y-\Delta y) + W_e(x,y) + \psi(x-\Delta x, y-\Delta y) + \frac{\pi}{2}(N-1)\right\}\right] \quad (16)$$

By executing the calculating procedure of equations (6), (7), (8) and (10), then equation (12) can be written by equation (17).

$$E(X,Y) = \frac{\sin\{W_e(X,Y) + \psi(X-\Delta x, Y-\Delta y)\}}{\cos\{W_e(X,Y) + \psi(X-\Delta x, Y-\Delta y)\}} \quad (17)$$

On one hand, the operation to obtain arctan $E(X,Y)$ shown in equation (13) can be expressed by:

$$\arctan E(X,Y) = W_e(X,Y) + \psi(X-\Delta x, Y-\Delta y) \quad (18)$$

Since equation (18) includes the phase distortion $W_e(X,Y)$ of the object beam 6 due to the deviations of the position and attitude of the object, the accurate forming error cannot be obtained unless the $W_e(X,Y)$ is removed. Therefore, by rotating the screw members 18 and 19 attached to the holding device 17 in a proper direction to adjust the position and attitude of the aspherical mirror 16 to the interferometer 3 in a manner such that the standard deviation regarding all pixels of the arctan $E(X,Y)$, namely, $$\sigma_E = \sqrt{\sum_{j=1}^{n}\sum_{i=1}^{m}\frac{\{\arctan E(X_i,Y_j)\}^2}{mn} - \left(\sum_{j=1}^{n}\sum_{i=1}^{m}\frac{\arctan E(X_i,Y_j)}{mn}\right)^2} \quad (19)$$

(where, "m" and "n" are respectively the numbers of pixels in the x and y directions, and $X_i$ and $Y_j$ are coordinate values of the central positions of the i-th pixel in the X direction and of the j-th pixel in the Y direction) becomes minimum, the $\psi(X,Y)$ is hardly changed in dependence on the position and attitude of the aspherical mirror 16 and becomes substantially constant. Consequently, it can be considered that $W_e(X,Y) \approx 0$ with regard to all pixels from equation (18). In this case, as will be obvious from equation (15), $\alpha=0$, $\Delta x=0$, $\Delta y=0$, $T_1=0$, and $T_2=0$, and equation (18) becomes arctan $E(X,Y) = \psi(X,Y)$. By substituting this equation to the equation $$H(x,y) = \psi(x,y) \times \frac{\lambda}{4\pi} + K,$$

the forming error $H(x,y)$ can be derived.

When using a one-dimensional sensor, e.g., photo array sensor as the sensor-monitor 11, the number of pixels is small and the operating time is short. However, when a two-dimensional sensor is used, the number of pixels becomes large and the arithmetic operations and adjusting operations by use of the screws have to be alternately repeated, requiring a long time. In such a case, the $W_e(X,Y)$ is obtained by deriving the above-mentioned five parameters $\alpha$, $\Delta x$, $\Delta y$, $T_1$ and $T_2$ by way of the arithmetic operations and $\psi(X,Y)$ cna be derived.

It is difficult to simultaneously obtain the five parameters by the arithmetic operations in the memory-data processor 15. Therefore, these five parameters are divided and sequentially obtained. The procedure in this case will then be explained hereinbelow.

To simplify the operations, the points such that the term of $\alpha$ is an even degree, the other terms are an odd degree, $T_1$ is the term relative to only the x axis, and $T_2$ is the term regarding only the y axis are utilized. First, to obtain $T_1$ and $\Delta x$, only the x axis is considered. Equation (15) becomes $$W_e(x,0) = \alpha \cdot (x-\Delta x)^2 + T_1 \cdot (x-\Delta x) \tag{20}$$

It is now assumed that the prediction values of $\Delta x$ and $T_1$ are $\Delta x'$ and $T_1'$, and the following operation is performed to delete the terms of the even degree.

$$g(X,\Delta x',T_1') = \arctan E(x+\Delta x',0) - \arctan E(-x+\Delta x',0) - 2T_1' \cdot x \tag{21}$$

By substituting equations (18) and (20) for equation (21), we have $$g(X,\Delta x',T_1') = \alpha \cdot \{(x - \Delta x + \Delta x')^2 - \tag{22}$$
$$(-x - \Delta x + \Delta x')^2\} + T_1 \cdot \{(X - \Delta x + \Delta x') -$$
$$(-X - \Delta x + \Delta x)\} + \psi(X - \Delta x + \Delta x') -$$
$$\psi(-X - \Delta x + \Delta x') - 2T_1' \cdot X$$
$$= 4\alpha \cdot X(\Delta x' - \Delta x) + 2X \cdot (T_1 - T_1') + \psi(X - \Delta x + \Delta x') - \psi(-X - \Delta x + \Delta x')$$

From equation (22), when $\Delta x = \Delta x'$ and $T_1 = T_1'$, we have $g(X,\Delta x',T_1') = \psi(-\Delta x + x') - \psi(-X - \Delta x + \Delta x')$ and the standard deviation $\sigma_{gx}$ of $g(X,\Delta x', T_1')$ for all pixels on the x axis, $$\sigma_{gX} = \sqrt{\sum_{i=1}^{\frac{m}{2}} \frac{\{g(X,\Delta x',T_1')\}^2}{\frac{m}{2}} - \left(\sum_{i=1}^{\frac{m}{2}} \frac{g(X,\Delta x',T_1')}{\frac{m}{2}}\right)^2} \tag{23}$$

shows the minimum value. The values of $\Delta x'$ and $T1'$ to make the deviation $\sigma_{gx}$ minimum are derived. These values can be easily obtained by way of a general trial and error method as well since the number of parameters is merely two.

Similarly, with respect to the y axis, $g(Y, \Delta y', T_2')$ is calculated and the values of $\Delta y'$ and $T_2'$ to make the $\sigma_{gY}$ minimum are obtained. In this manner, four of five parameters can be derived. The remaining one parameter may be derived in a manner such that on the basis of $\Delta x'$, $\Delta y'$, $T_1'$, and $T_2'$ obtained so far, $\Delta x = \Delta x'$, $\Delta y = \Delta y'$, $T_1 = T_1'$, and $T_2 = T'$ are substituted for equations (15) to (19) and the value of $\alpha$ to make the $\sigma_E$ minimum is derived. Thus, all of five parameters can be obtained and the values of arctan $E(X,Y)$ and $W_e(X,Y)$ in equations (15), (16), (17) and (18) can be derived. Therefore, $\psi(X-\Delta x, Y-\Delta y)$ is obtained from the difference and the forming error $H(X-\Delta x, Y-\Delta x)$ can be derived from $$H(X - \Delta x, Y - \Delta y) = \psi(X - \Delta x, Y - \Delta y) \times \frac{\lambda}{4\pi} + K.$$

When the object is the aspherical mirror as in this embodiment, no problem will be actually caused even if the focal distance of the aspherical mirror is slightly different from the designing value, if it is within a common difference (i.e., tolerance). However, upon measurement, this difference can be seemingly measured as a forming error. Therefore, when setting a parameter $\beta$ regarding the deviation of the focal distance, equation (15) becomes:

$$W_e(x,y) = \alpha \cdot \{(x-\Delta x)^2 + (y-\Delta y)^2\} + \beta \cdot \{(x-\Delta x)^2 + (y-\Delta y)^2\}^2 + T_1 \cdot (x-\Delta x) + T_2 \cdot (y-\Delta y) \tag{24}$$

Since $\beta \cdot \{(x-\Delta x)^2 + (y-\Delta y)^2\}^2$ is also an even function, the values of $\alpha$ and $\beta$ which make the $\sigma_E$ minimum are obtained after obtaining $\Delta x$, $\Delta y$, $T_1$, and $T_2$ as mentioned above.

In this way, the forming error can be derived.

According to the measuring method as described above, the arithmetic operation method is new and improved. Therefore, even in the case of a complicated object, if it is optically smooth and can be expressed by mathematical expressions, such as an aspherical object or the like, the forming error can be easily simply measured with a high degree of accuracy. At the same time, even if a sense-monitor with a small number of pixels is used, such a complicated object can be measured with a high degree of precision.

In this embodiment, the phase of the reference beam 7 has to be changed accurately by $\pi/2$ at a time. A method for calibrating the phase change will then be explained hereinbelow. If it is assumed that this calibration is not completed and the phase of the reference beam 7 changes by $$\left(\frac{\pi}{2} + \epsilon\right)$$

at a time, equation (3) will become:

$$I_N(x,y) = I_0(x,y)\left[1 + \gamma\cos\left\{W(x,y) + \psi(x,y) + \left(\frac{\pi}{2} + \epsilon\right)(N-1)\right\}\right] \tag{25}$$

By substituting equation (25) for equation (5), $E_N(X,Y)$ becomes:

$$E_N(X,Y) = I_0(x,y) \int_{Y-\frac{b}{2}}^{Y+\frac{b}{2}} \int_{Y-\frac{a}{2}}^{X+\frac{a}{2}} f(x-X,y-Y) + \tag{26}$$
$$f(x - X, y - Y) \cdot \gamma \cdot \cos\left\{W(x,y) + \psi(x,y) + \left(\frac{\pi}{2} + \epsilon\right)(N-1)\right\} dxdy$$

By calculating $$D(X,Y) = \{E_1(X,Y) + E_3(X,Y)\} - \{E_2(X,Y) + E_4(X,Y)\}$$

from equation (26), we have $$D(X,Y) = I_0(X,Y) \cdot \gamma \cdot \int_{Y-\frac{b}{2}}^{Y+\frac{b}{2}} \int_{X-\frac{a}{2}}^{X+\frac{a}{2}} \cos\{W(x,y) + \psi(x,y)\} + \cos\{W(x,y) + \psi(x,y) + \pi + 2\epsilon\} + \cos\left(W(x,y) + \psi(x,y) + \frac{\pi}{2} + \epsilon\right) + \cos\left(W(x,y) + \psi(x,y) + \frac{3}{2}\pi + 3\epsilon\right) dxdy \quad (27)$$

$$= I_0(X,Y) \cdot \gamma \cdot \int_{Y-\frac{b}{2}}^{Y+\frac{b}{2}} \int_{X-\frac{a}{2}}^{X+\frac{a}{2}} [\cos\{W(x,y) + \psi(x,y)\} - \cos\{W(x,y) + \psi(x,y)\} \cdot \cos 2\epsilon + \sin\{W(x,y) + \psi(x,y)\} \cdot \sin 2\epsilon + \sin\{W(x,y) + \psi(x,y)\} \cdot \cos\epsilon + \cos\{W(x,y) + \psi(x,y)\} \cdot \sin\epsilon - \sin\{W(x,y) + \psi(x,y)\} \cdot \cos 3\epsilon - \cos\{W(x,y) + \psi(x,y)\}\sin 3\epsilon] dx$$

Since $\epsilon \approx 0$, assuming that $\sin\epsilon = \epsilon$, $\sin 2\epsilon = 2\epsilon$. $\sin 3\epsilon = 3\epsilon$, and $\cos\epsilon = \cos 2\epsilon = \cos 3\epsilon = 1$, we have $$D = I_0(X,Y) \cdot \gamma \cdot \int_{Y-\frac{b}{2}}^{Y+\frac{b}{2}} \int_{X-\frac{a}{2}}^{X+\frac{a}{2}} 2\epsilon\sin\{W(x,y) + \psi(x,y)\} - 2\epsilon\cos\{W(x,y) + \psi(x,y)\} \quad (28)$$

$$= 2\epsilon \cdot I_0(X,Y) \cdot \gamma \cdot \int_{Y-\frac{b}{2}}^{Y+\frac{b}{2}} \int_{X-\frac{a}{2}}^{X+\frac{a}{2}} \sqrt{2} \sin\left(W(x,y) + \psi(x,y) + \frac{\pi}{4}\right) dxdy$$

From equation (28), if the phase of the reference beam 7 accurately changes by $\pi/2$ at a time, $\epsilon = 0$ and D also becomes zero. Namely, the position of the reference beam 7 is adjusted by controlling the driver 13 by way of the drive controller 14 in a manner such that D becomes zero with respect to all pixels.

In the foregoing embodiment, the measuring method of the invention was applied to an aspherical mirror as an object to be measured. However, the present invention is not limited to the above mentioned embodiment. This invention may be applied to any other objects whose surfaces are smooth to the laser beam from the light source used and whose shapes can be expressed by mathematical expressions. In this case, the arithmetic operation procedure from equation (3) to equation (19) are substantially the same.

Although the laser beam was used as a light source, for example, it is possible to use any light source which can emit a coherent light. For instance, an infrared laser beam, near ultraviolet rays from a mercury lamp, or the like may be used.

Although the Michelson's interferometer was used as an interferometer, any other interferometers adapted to measure the shape with a surface which is optically smooth can be used. For example, a Mach-Zehnder interferometer, Fizeau interferometer, or the like may be used.

As the sensor-monitor, there are image sensors of the accumulation type such as an ITV or CCD sensor and the sensors of other type such as a photo array sensor, image dissector or the like. With any such sensor, the forming error can be obtained by way of the same operation procedure. The uniaxial sectional shape can be obtained with a linear array sensor.

Although the shape of the reference beam was changed by $\pi/2$ at a time in a stepwise manner in the foregoing embodiment, this phase may be continuously varied and data may be instantaneously taken in at a timing deviated by $\pi/2$. There is no need to instantaneously take in the data at the same timing with regard to all pixels but the data can be also taken in sequentially on one pixel unit basis. In such a case, the phases of the reference beam differ little by little for every pixel and, therefore, the amount commensurate with such a phase difference is subtracted from the forming data measured.

In this embodiment, the phase of the reference beam was changed. However, a similar effect can be derived even if the driver 13 is provided for the aspherical mirror 16 and the phase of the object beam 6 is changed by driving the driver 13.

Although the light reflected by the surface of the aspherical mirror 16 was used as the object beam 6 in this embodiment, in the case where an object is transparent, the light transmitted through the object may be used as the object beam.

In this embodiment, in order to remove the measurement error caused due to the deviations of the position and the attitude of the object, standard deviations $\sigma_E$ and $\sigma_{gx}$ are made minimum. Instead, E(Xi, Yj) in equation (17) and g(X, Δx', T$_1$') in equation (23) may be considered as roughnesses in the surface of the object and any item of the surface roughness may be made minimum.

A measuring method and a measuring apparatus according to another embodiment of the present invention will be described with reference to FIGS. 8 to 12.

Figure 8:
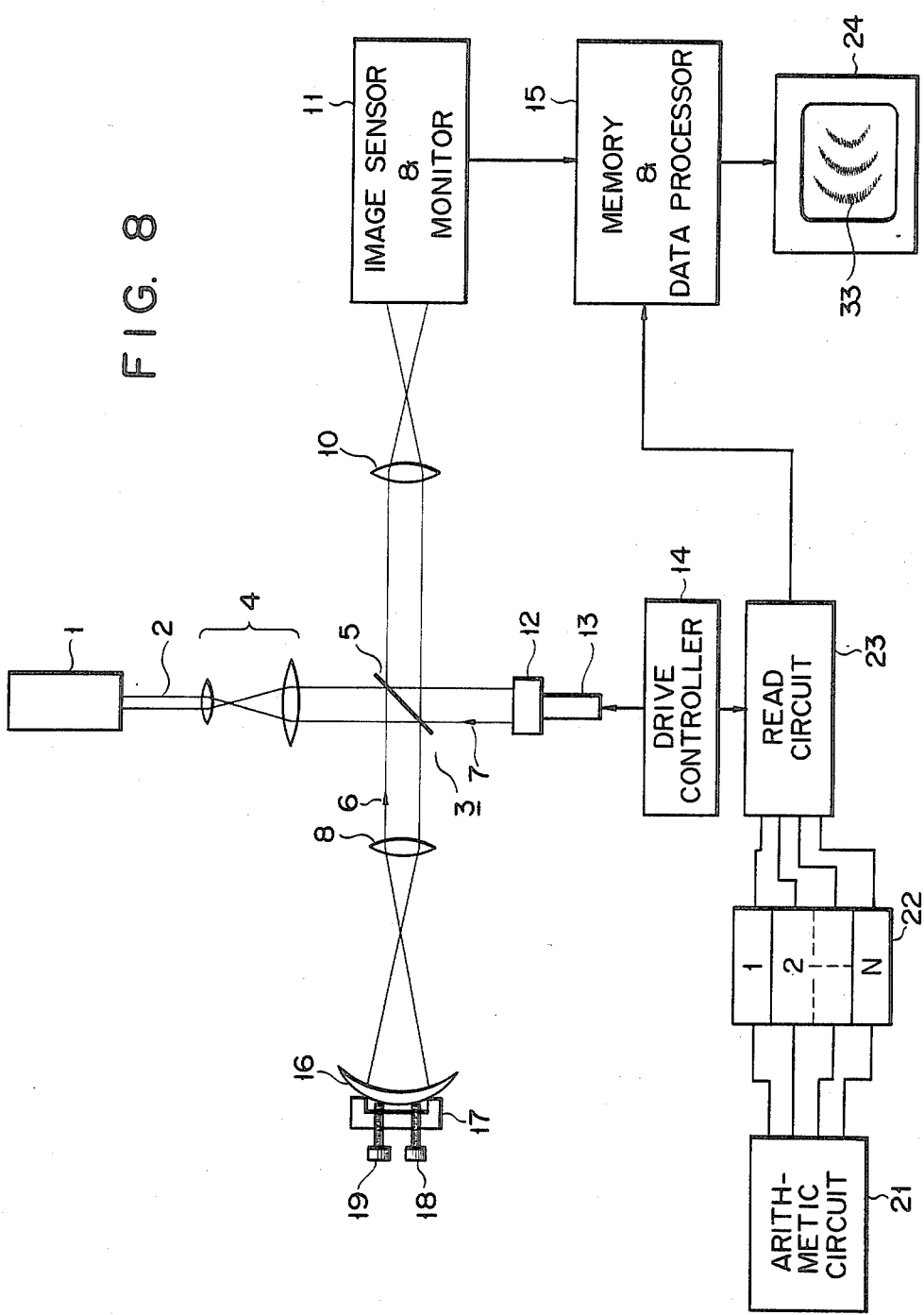
FIG. 8 is a diagram schematically showing an arrangement of a measuring apparatus according to another embodiment of the present invention.

FIG. 8 is a diagram schematically showing the measuring apparatus, in which the parts and components corresponding to those in the conventional measuring apparatus shown in FIG. 1 are designated by the same reference numerals.

Figure 9:
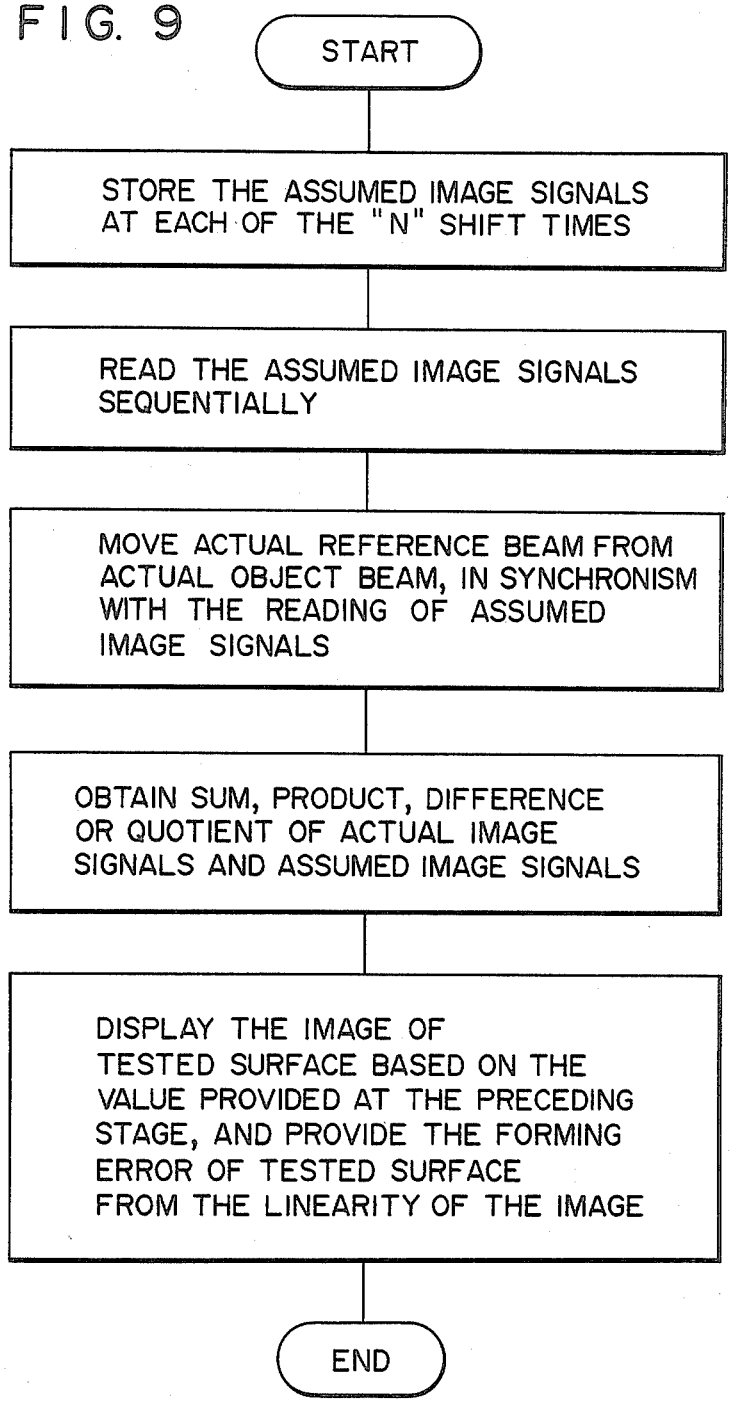
FIGS. 9 and 10 are operation flow charts showing the measuring method which is executed by the measuring apparatus shown in FIG. 8 according to the present invention.
Figure 10:
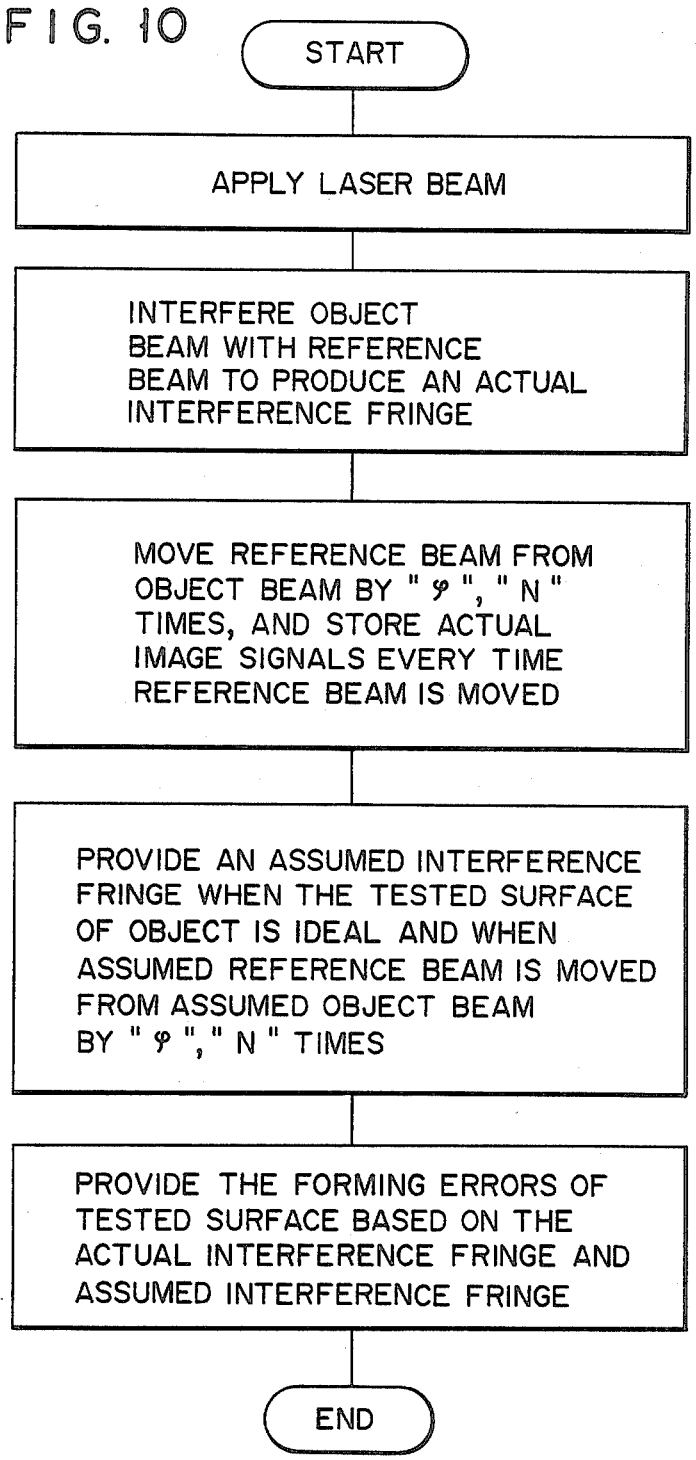

The operation will then be described hereinbelow with reference to flow charts of FIGS. 9 and 10.

Figure 11:
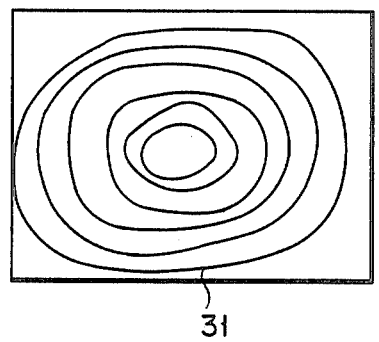
FIGS. 11 and 12 are diagrams showing the moire fringes derived by the measuring apparatus of FIG. 8.

The coherent light source 1, for example, a laser generator irradiates a coherent beam. The laser beam irradiated from the laser generator 1 enters the Michelson's interferometer 3 arranged on the path of the laser beam. The interferometer 3 comprises a collimator lens 4, a half mirror 5, a condenser lens 8, and an image-forming lens 10. The laser beam entered the collimator lens 4 is enlarged to have a wide beam width and converted to the parallel beam. The half mirror 5 is arranged on the path of the parallel beam with an angle of about 45° and the parallel beam enters the half mirror 5. The half mirror 5 separates the incident laser beam into the deflection laser beam which progresses in the direction normal to the advancing direction of the parallel beam and the straight laser beam which directly progresses in the straight direction. The deflection laser beam is projected onto an aspherical mirror 16 as an object to be measured which is arranged forward in the progressing direction of the deflection laser beam through a condenser lens 8 arranged in that progressing direction. This deflection laser beam is then reflected by the mirror 16. The reflected beam is returned as an object beam 6 to the condenser lens 8 and converted to the parallel beam and transmitted through the half mirror 5. Thereafter, the parallel beam is transmitted to the sensor-monitor 11 through the image-forming lens 10 arranged on the path of the parallel beam. On one hand, the straight laser beam which was transmitted through the half mirror 5 and went straight is projected onto a reference mirror 12 arranged in the progressing direction of this straight beam and reflected by the mirror 12. The reflected laser beam is returned as a reference beam 7 to the half mirror 5 and deflected thereby and transmitted to the sensor-monitor 11 through the image-forming lens 10. The condenser lens 8 deflects the incident laser beam such that it enters perpendicularly to the aspherical mirror 16. The image-forming lens 10 deflects the object beam 6 and reference beam 7 so that they are directed to the image sensing section of the sensor-monitor 11. The object beam 6 and reference beam 7 are made interfere by the interferometer 3, so that the interference fringe due to the interference of the object beam 6 and reference beam 7 is formed on the image display screen of the sensor & monitor 11 as shown in FIG. 11. The aspherical mirror 16 is held at a predetermined position by a holding device 17. On one hand, the position and attitude of the aspherical mirror 16 can be adjusted by screw members 18 and 19 attached to the holding device 17. In this embodiment, the present invention is applied to the measurement of the forming error of the aspherical mirror 16. However, the invention can be obviously also applied to a measurement of the forming error of a plane mirror. In such a case, the condenser lens 8 is unnecessary and the laser beam which was deflected by the half mirror 5 and projected onto the plane mirror directly enters the plane mirror as the parallel beam. This deflected laser beam is returned as the parallel beam to the half mirror 5.

In the apparatus of FIG. 8, the driver 13 is attached under the reference mirror 12. By driving the driver 13, the reference mirror 12 is minutely moved, so that the phase of the reference beam 7 is changed and the interference fringe also changes. In this embodiment, the phase of the reference beam 7 changes in N stages (N is an integer of 2 or more) by $\psi$ at a time due to the movement of the driver 13.

Figure 12:
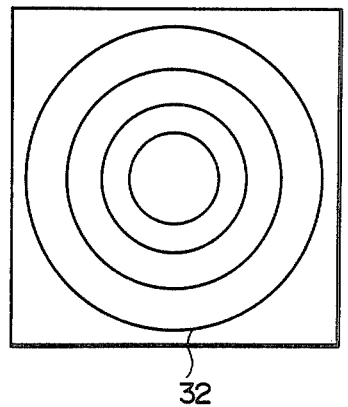

In this embodiment, an arithmetic circuit 21 is provided. The arithmetic circuit 21 computes an image signal of a virtual interference fringe which is assumed to be displayed on the display screen of the sensor-monitor 11 when it is assumed that the aspherical mirror 16 is ideal and does not have any forming error. If the signal calculated is inputted to a video apparatus, e.g., a TV monitor 24, a virtual interference fringe 32 as shown in FIG. 12 will be displayed. The arithmetic circuit 21 further calculates the virtual interference fringes when the phase of the reference beam 7 was changed in N stages by $\psi$ at a time. The calculated virtual interference fringes are inputted to a storage device 22 having N memory sections and stored therein. A reading circuit 23 is further provided to sequentially read out image signals of N virtual interference fringes having different phases from the N memory sections in response to control signals from a drive controller 14 in synchronism with the driving of the driver 13. In this embodiment, the drive controller 14 outputs a control signal to the driver 14 to control the driving thereof and also outputs a readout signal to the reading circuit 23 in synchronism with the driving of the driver 14. The image signal of the virtual interference fringe read out by the reading circuit 23 in response to a read signal from the controller 14 is input to the memory-data processor 15. The memory-processor 15 receives the image signal of the virtual interference fringe from the reading circuit 23 and the image signal of the actual interference fringe of the aspherical mirror 16 from the sensor-monitor 11 and calculates the sum, product, difference, or quotient of both of those image signals. The reason why this calculation is performed is to provide a moire fringe of an actual interference fringe and a virtual interference fringe. The result of the calculation by the memory-processor 15 is input to the video apparatus, e.g., the TV monitor 24. In this case, the moire fringe 33 produced by the actual interference fringe and the virtual interference fringe is displayed on the display screen. When the aspherical mirror 16 of the object to be measured does not have any forming error, the moire fringe 33 is not formed or can become the straight lines by adjusting the position and attitude of the aspherical mirror 16 by use of the adjusting screw members 18 and 19 attached to the holding device 17. When the mirror 16 has forming errors, the moire fringe 33 certainly becomes curved lines. As mentioned above, by changing the phase of the reference beam 7 in N stages, only the moire fringe clearly appears. Therefore, the linearity of the moire fringe produced can be detected with a high degree of accuracy and the forming errors of the aspherical mirror 16 can be measured from the linearity. The forming error can be obtained with a highest degree of accuracy when the highest linearity is derived by adjusting the position and attitude of the aspherical mirror 16 with the screw members 18 and 19.

In general, TV monitors display thirty picture planes for one second. Thus, the clearest moire fringe can be derived when N is 3 or 4 and $\psi$ is $2\pi/N$.

The description has been made in the above by assuming that the aspherical mirror as the object to be measured is optically smooth. However, in the case of using an infrared laser as the coherent light source, the measuring method of the present invention can be also applied to any other aspherical mirror which is smooth to the infrared rays as an object to be measured. On the other hand, when the object to be measured is an aspherical lens, the aspherical lens and a mirror with a high-precise (flat or spherical) shape are combined and the forming error of the aspherical lens can be measured. Further, although the Michelson's interferometer was used in the foregoing embodiment, a Mach-Zehnder type interferometer or Fizeau type interferometer may be used.

As will be obvious from the above description, according to the present invention, in measurement of the forming error of an object of a three-dimensional shape, e.g., an aspherical mirror which is optically smooth and whose shape can be expressed by mathematical expressions, it is possible to obtain the clear moire fringe representative of the difference between the ideal virtual shape calculated by the arithmetic apparatus and having no forming error and the shape of the actual object. Due to this, the forming errors can be measured with a high degree of accuracy. In addition, the measuring apparatus of the invention can be constituted by merely adding a few components to the conventional constitution shown in FIG. 1 and the cost is not so highly increased.

What is claimed is:

1. A method of measuring a forming error of an object to be measured comprising the steps of:
   (a) generating a coherent lioht beam;
   (b) making a beam of said coherent light beam which is reflected from a reference surface as a reference beam interfere with a beam reflected from a measuring surface of said measuring object as an object beam, thereby producing an interference fringe;
   (c) measuring an actual phase difference between said reflected beam and said object beam based on the derived interference fringe;
   (d) determining a theoretical phase difference between an ideal object beam which is obtained when said object is assumed ideal and an ideal reference beam which is obtained when said reference surface is assumed ideal; and
   (e) obtaining a forming error of said actual object based on said actual and theoretical phase differences.

2. A measuring method according to claim 1, further having the step of determining the minimum value of said forming error by changing the position and attitude of said measuring surface.

3. A measuring method according to claim 1, further having the step of determining the minimum value of said forming error by changing the position of said measuring surface.

4. A method of measuring a forming error of an object to be measured comprising the steps of:
   (a) projecting a coherent light beam;
   (b) making a light of said coherent light beam which is reflected from a reference surface as a reference interfere with a light, as an object beam, from a measuring surface of the object whose forming error is measured, thereby obtaining an interference light of said reflected light;
   (c) determining an intensity distribution of an interference fringe based on said interference light; and
   (d) calculating a forming error of said measuring surface of said object to be measured based on said intensity distribution, this calculating step including the procedures of:
   relatively changing a phase difference $\psi(x,y)$ of said reflected light,
   storing on an X-Y coordinate plane intensity distributions of said interference light which are respectively obtained when said phase difference $\psi(x,y)$ is changed to $$\psi(x,y), \psi(x,y) + \frac{\pi}{2}, \psi(x,y) + \pi, \text{ and } \psi(x,y) + \frac{3}{2\pi}$$

as intensity distributions $E_1(X,Y)$, $E_2(X,Y)$, $E_3(X,Y)$, and $E_4(X,Y)$,
   calculating a phase distribution $W(x,y)$ of a virtual object beam which is reflected from said measuring surface on the basis of design values of the shape of said measuring surface when there is no forming error,
   calculating $$C(X,Y) = \int_{Y-\frac{b}{2}}^{Y+\frac{b}{2}} \int_{X-\frac{a}{2}}^{X+\frac{a}{2}} f(x-X, y-Y) \cdot \cos W(x,y) dx dy$$

$$S(X,Y) = \int_{Y-\frac{b}{2}}^{Y+\frac{b}{2}} \int_{X+\frac{a}{2}}^{X+\frac{a}{2}} f(x-X, y-Y) \cdot \sin W(x,y) dx dy$$

when it is assumed that an intensity distribution in a pixel at a (X,Y) coordinate position is $f(x-X, y-Y)$ and a size of said pixel is "a" in the x direction and "b" in the y direction,
   calculating the phase difference $\psi(X,Y)$ at said (X,Y) coordinate position by calculating $$E(X,Y) = \frac{C(X,Y)\{E_4(X,Y) - E_2(X,Y)\} - S(X,Y)\{E_1(X,Y) - E_3(X,Y)\}}{C(X,Y)\{E_1(X,Y) - E_3(X,Y)\} + S(X,Y)\{E_4(X,Y) - E_2(X,Y)\}}$$

and $$\arctan\{E(C,Y)\} = \psi(X,Y),$$

and
   calculating the forming error of said object on the basis that there is a linear relation between said phase difference $\psi(X,Y)$ and the forming error of said object to be measured at said (X,Y) coordinate position.

5. A measuring method according to claim 4, further having the step of determining the minimum value of said forming error by changing the position and attitude of said measuring surface.

6. A measuring method according to claim 4, further comprising the step of calculating a standard deviation $\sigma_E$ $$\sigma_E = \sqrt{\sum_{j=1}^{n} \sum_{i=1}^{m} \frac{\{\arctan E(Xi, Yj)\}^2}{mn} - \left(\sum_{j=1}^{n} \sum_{i=1}^{m} \frac{\arctan E(Xi, Yj)}{mn}\right)^2}$$

of arctan $\{E(X_i, Y_j)\}$ when it is assumed that the numbers of pixels in the x and y directions on said X-Y plane are respectively "m" and "n" and the central coordinate positions of the i-th pixel in the x direction and of the j-th pixel in the y direction are $X_i$ and $Y_j$ and an intensity of luminance of said pixel is $E(X_i, Y_j)$, and adjusting relative positions and/or attitudes of said object to be measured (9) and an interferometer (3) such that said standard deviation $\sigma_E$ has the minimum value.

7. A measuring method according to claim 6, further comprising the steps of:
   determining $\Delta x$, $\Delta y$, $\Delta z$, $T_1$, $T_2$, and $T_3$ when it is assumed that deviation of said relative positions and/or attitudes is $\Delta x$ in the x direction, $\Delta y$ in the y direction, $\Delta z$ in the z direction, $T_1$ in the direction of a rotational angle of the y axis, $T_2$ in the direction of a rotational angle of the x axis, and $T_3$ in the direction of a rotational angle of the z axis, and a contribution to the phase difference between said object beam and said reference beam due to said deviation is $W_e(x,y)$;

calculating arctan{E(X,Y)} and the $W_e(x,y)$ from the values of said $\Delta x$, $\Delta y$, $\Delta z$, $T_1$, $T_2$, and $T_3$ obtained; and performing an arithmetic operation $$\psi(X,Y) = \arctan\{E(X,Y)\} - W_e(X,Y)$$

to determine the $\psi(X,Y)$ by subtracting the $W_e(X,Y)$ from the arctan {E(X,Y)} whe it is assumed that intensity of luminance E(X,Y) of the pixel when the (X,Y) coordinate position on the X-Y coordinate plane is the central coordinate position.

8. A measuring method according to claim 7, wherein, when said measuring surface of said object to be measured is an optical device with a rotational aspherical surface, said method further comprises the steps of:

performing arithmetic operations $$C'(X,Y) = \int_{Y-\frac{b}{2}}^{Y+\frac{b}{2}} \int_{X-\frac{a}{2}}^{X+\frac{a}{2}} f(x-X, y-Y) \cdot \cos\{W(x-\Delta x, y-\Delta y) + W_e(x,y)\} dxdy$$

$$S'(X,Y) = \int_{Y-\frac{b}{2}}^{Y+\frac{b}{2}} \int_{X-\frac{a}{2}}^{X+\frac{a}{2}} f(x-X, y-Y) \cdot \sin\{W(x-X, y-Y) + W_e(x,y)\} dxdy$$

$$E'(X,Y) = \frac{C'(X,Y)\{E_4(X,Y) - E_2(X,Y)\} - S'\{E_1(X,Y) - E_3(X,Y)\}}{C'(X,Y)\{E_1(X,Y) - E_3(X,Y)\} + S'\{E_4(X,Y) - E_3(X,Y)\}}$$

in place of $\psi(X,Y) = \arctan\{E(X,Y)\} - W_3(X,Y)$ performing an operation $\psi(X,Y) = \arctan E'(X,Y)$, and determining the forming errors from the derived $\psi(X,Y)$.

9. A measuring method according to claim 7, further comprising, as the steps of determining said $\Delta x$, $\Delta y$, $\Delta z$, $T_1$, $T_2$, and $T_3$, the steps of: assuming the prediction values $\Delta x'$, $\Delta y'$, $\Delta z'$, $T_1'$, $T_2'$, and $T_3'$ of said six values; calculating the prediction value $W_e'(X,Y)$ of the $W_e(X,Y)$ while changing said six values, substituting said $W_e'(X,Y)$ for the $W_e(X,Y)$; calculating $$\sigma_E = \sqrt{\sum_{j=1}^{n}\sum_{i=1}^{m} \frac{\{\arctan E'(Xi,Yj)\}^2}{mn} - \left(\sum_{j=1}^{n}\sum_{i=1}^{m} \frac{\arctan E'(Xi,Yj)}{mn}\right)^2}$$

and determining the values of $\Delta x'$, $\Delta y'$, $\Delta z'$, $T_1'$, $T_2'$, and $T_3'$ when said $\sigma_E$ has the minimum value as the values which are equal to said $\Delta x$, $\Delta y$, $\Delta z$, $T_1'$ $T_2'$ and $T_3$.

10. A measuring method according to claim 9, wherein, when said measuring surface of said object to be measured is an optical device with a rotational aspherical surface, the step of determining $T_3$ among the steps of determining the $\Delta x$, $\Delta y$, $\Delta z$, $T_1$, $T_2$, and $T_3$ is removed.

11. A measuring metho according to claim 10, wherein in place of the step of obtaining said $\Delta z$, a step of obtaining a coefficient $\alpha$ of a phase distortion of the object beam due to the $\Delta z$ is provided, and said $W_e(x,y)$ is obtained by performing an operation $$W_e(x,y) = \alpha \cdot \{(x-\Delta x)^2 + (y-\Delta y)^2\} + T_1 \cdot (x-\Delta x) + T_2 \cdot (y-\Delta y).$$

12. A measuring method according to claim 11, further comprising a step of obtaining a coefficient $\beta$ of a phase distortion of the object beam due to deviation of a focal distance of the optical device with the rotational aspherical surface, and in which the $W_e(x,y)$ is obtained by performing an operation $$W_e(x,y) = \alpha \cdot \{x-\Delta x)^2 + (y-\Delta y)^2\} + \beta \cdot \{(x-\Delta x)^{2'} + (y-\Delta y)^{2'}\}^2 + T_1 \cdot (x-\Delta x) + T_2 \cdot (y-\Delta y).$$

13. A measuring method according to claim 12, comprising the steps, as the steps of obtaining said $\alpha$, $\beta$, $\Delta x$, $\Delta y$, $T_1'$ and $T_2'$ of first, considering the portion on the x axis and assuming that $W_e(x,0) = \alpha \cdot (x-\Delta x)^2 + \beta \cdot (x-x)^4 + T_1(x-\Delta x)$ and the prediction values of said $\Delta x$ and $T_1$ are $\Delta x'$ and $T_1'$, defining $g(X, \Delta x', T_1')$ with respect to the pixel of the coordinate values of (X,0), operating a standard deviation of $\sigma_g X$ the $g(X, \Delta x', T_1')$ while changing said $\Delta x'$ W and $T_1'$, namely, $$\sigma_g X = \sqrt{\sum_{i=1}^{\frac{m}{2}} \frac{\{g(X, \Delta x', T_1')\}^2}{\frac{m}{2}} - \left(\sum_{i=1}^{\frac{m}{2}} \frac{g(X, \Delta x', T_1')}{\frac{m}{2}}\right)^2} \quad (23)$$

determining the values of the $\Delta x'$ and $T_1'$ when said $\sigma_g X$ has the minimum value, and adopting the values of said $\Delta x'$ and $T_1'$ as the values which are respectively equal to the values of the $\Delta x$ and $T_1$ to be derived;

second, considering the portion on the y axis and assuming that $W_e(0,y) = \alpha \cdot (y-\Delta y)^2 + \beta \cdot (y-\Delta y)^4 + 2(y-\Delta y)$ and the prediction values of said $\Delta y$ and $T_2$ are $\Delta'$ and $T_2'$, defining $g(Y, \Delta y', T_2') = \arctan E'(Y+\Delta y', 0) - \arctan E'(-Y-\Delta y', 0) - 2T_2'Y$ and $g(Y, \Delta y', T_2')$ with respect to the pixel of the coordination values of (0,Y), calculating a standard deviation $\sigma_g Y$ of the $g(Y, \Delta y', T_2')$ while changing said $\Delta y'$ and $T_2'$, determining the values of the $\Delta y'$ and $T_2'$ when said $\sigma_g Y$ has the minimum value, and adopting the values of said $\Delta y'$ and $T_2'$ as the values which are equal to the values of said $\Delta y$ and $T_2$ to be derived; and third, substituting said $\Delta x$, $\Delta y$, $T_1$, and $T_2$ determined for the arithmetic operation of the $W_e(x,y)$ set forth in claim 12, calculating the $E'(X,Y)$ set forth in claim 5 while changing the values of $\alpha$ and $\beta$ in the $W_e(x,y)$, calculating the $\sigma_E'$ set forth in claim 6, and adopting the values of $\alpha$ and $\beta$ when said $\sigma_E'$ has the minimum value as the values of α and β to be determined.

14. A measuring method according to claim 13, wherein when said standard deviations are determined, in place of performing the operations with respect to all of the pixels for the standard deviations $\sigma_E$ and $\sigma_E'$ and and the operations with regard to all of the pixels on the respective x and y axes for the standard deviations $\sigma_{gX}$ and $\sigma_{gY}'$ the operations for the standard deviations are performed with respect to only a particular plurality of pixels among those pixels.

15. A measuring method according to claim 13 further having the step of determining the minimum value of said forming error by changing the attitude of said measuring surface.

16. A measuring method according to claim 9, wherein when said standard deviations are determined, in place of performing the operations with respect to all of the pixels for the standard deviations $\sigma_E$ and $\sigma_E'$ and and the operations with regard to all of the pixels on the respective x and y axes for the standard deviations $\sigma_{gX}$ and $\sigma_g Y'$ the operations for the standard deviations are performed with respect to only a particular plurality of pixels among those pixels.

17. A measuring method according to claim 6, wherein when said standard deviations are determined, in place of performing the operations with respect to all of the pixels for the standard deviations $\sigma_E$ and $\sigma_E'$ and and the operations with regard to all of the pixels on the respective x and y axes for the standard deviations $\sigma_{gX}$ and $\sigma_{gY}'$ the operations for the standard deviations are performed with respect to only a particular plurality of pixels among those pixels.

18. A measuring method according to claim 4, further having the step of determining the minimum value of said forming error by changing the position of said measuring surface.

19. A measuring method according to claim 4, further having the step of determining the minimum value of said forming error by changing the attitude of said measuring surface.

20. An apparatus for measuring a forming error of an object to be measured comprising:
   (a) means for projecting a coherent light beam;
   (b) making a light of said coherent light beam which is reflected from a reference surface as a reference beam interfere with a light reflected as an object beam from a measuring surface of the object whose forming error is measured, thereby obtaining an interference light of said reflected light;
   (c) means for changing said interference light into an electric signal and providing an intensity distribution of an interference fringe based on said interference light; and
   (d) means for calculating a forming error of said measuring surface of said object to be measured based on said intensity distribution, said calculating means comprising:
   means for relatively changing a phase difference $\psi(x,y)$ of said reflected light,
   means for storing on an X-Y coordinate plane intensity distributions of said interference light which are respectively obtained when said phase difference $\psi(x,y)$ is changed to $$\psi(x,y),\ \psi(x,y) + \frac{\pi}{2},\ \psi(x,y) + \pi,\ \text{and}\ \psi(x,y) + \frac{3}{2\pi}$$

as intensity distributions $E_1(X,Y)$, $E_2(X,Y)$, $E_3(X,Y)$, and $E_4(X,Y)$,
   means for calculating a phase distribution $W(x,y)$ of a virtual object beam which is reflected from said measuring surface on the basis of designing values of a virtual object beam which is reflected from said measuring surface on the basis of design values of the shape of said measuring surface when there is no forming error,
   means for calculating $$C(X,Y) = \int_{Y-\frac{b}{2}}^{Y+\frac{b}{2}} \int_{X-\frac{a}{2}}^{X+\frac{a}{2}} f(x-X, y-Y) \cdot \cos W(x,y) dx dy$$

$$S(X,Y) = \int_{Y-\frac{b}{2}}^{Y+\frac{b}{2}} \int_{X+\frac{a}{2}}^{X+\frac{a}{2}} f(x-X, y-Y) \cdot \sin W(x,y) dx dy$$

when it is assumed that an intensity distribution in a pixel at a $\Omega(X,Y)$ coordinate position is $f(x-X, y-Y)$ and a size of said pixel is a in the x direction and b in the y direction,
   means for calculating the phase difference $\Omega(X,Y)$ at said (X,Y) coordinate position by calculating $$E(X,Y) = \frac{C(X,Y)\{E_4(X,Y) - E_2(X,Y)\} - S(X,Y)\{E_1(X,Y) - E_3(X,Y)\}}{C(X,Y)\{E_1(X,Y) - E_3(X,Y)\} + S(X,Y)\{E_4(X,Y) - E_2(X,Y)\}}$$

and $$\arctan\{E(C,Y)\} = \Omega(X,Y),$$

and
   means for calculating the forming errors of said object to be measured on the basis that there is a linear relation between said phase difference $\psi(X,Y)$ and said forming errors of said object to be measured at said (X,Y) coordinate position.

21. A method of measuring a shape of an object to be measured comprising the steps of:
   (a) generating a coherent light beam;
   (b) making a beam of said coherent light beam which reflected from a reference surface as a reference beam interfere with a beam reflected, as an object beam, from a measuring surface of said measuring object, thereby producing an actual interference fringe;
   (c) changing a phase difference between said object beam and said reflected beam to N stages by $\psi$ at a time and storing an actual image signal at each of said N stages (N is an integer of 2 or more);
   (d) obtaining virtual interference fringes which are obtained in the case where it is assumed that said measuring surface has ideal design forming values and that a phase difference between a virtual object beam and a virtual reference beam is changed in N stages by $\psi$ at a time; and
   (e) measuring the forming error of said measuring surface on the basis of said actual interference fringe and said virtual interference fringe, said measuring step including the following procedures:

storing a virtual image signal at each stage of the change of the phase differences of said N stages when obtaining said virtual interference fringe, sequentially reading said virtual image signal at each stored stage, performing said change of said phase difference between said object beam and said reference beam in synchronism with said sequential reading, calculating a sum of said virtual image signal read out and said actual image signal, and displaying an image on the basis of the result of said calculation and measuring the forming error of said measuring surface of said object to be measured from a linearity of said image.

22. A measuring method according to claim 21, wherein $\psi = 2\pi/N$.

23. A measuring method according to claim 22, wherein N is 3 or 4.

24. An apparatus for measuring a forming error of an object to be measured comprising:
 (a) means for generating a coherent light beam;
 (b) reference means;
 (c) means for making a beam of said coherent light beam which is reflected from a reference surface of said reference means as a reference beam interfere with a beam reflected, as an object beam, from a measuring surface of said measuring object;
 (d) means for providing an actual interference fringe;
 (e) arithmetic means for obtaining virtual interference fringes when a phase difference between a virtual object beam from a virtual object and a virtual reference beam is changed in N stages at $\psi$ at a step when it is assumed that said measuring surface has ideal design forming values;

memory means for storing a virtual image signal at each of said N stages of said virtual interference fringes derived by said arithmetic means;

reading means for sequentially reading out the virtual image signal at each of said N stages from said memory means;

driving means for changing a phase of said reflected beam from said reference means by driving the reference means;

means for controlling said driving means so as to change the phase of said reflected beam from said reference beam to N stages by $\psi$ at a time in synchronism with the readout of said virtual image signal by said reading means;

signal processing means for calculating a sum of said virtual image signal and said readout means and the image signal of said actual interference fringe; and means for displaying an image on the basis of an output from said signal processing means and measuring the forming errors of said measuring surface of said object to be measured from a linearity of said image displayed.

25. A measuring apparatus according to claim 24, wherein $c = 2\pi/N$.

26. A measuring apparatus according to claim 25, wherein said N is 3 or 4.

27. A measuring apparatus according to claim 24, wherein said means for generating the coherent light beam is a visible laser generator.

28. A measuring apparatus according to claim 24, wherein said means for generating the coherent light beam is an infrared laser generator.

29. A measuring apparatus according to claim 24, wherein said interference means is a Mach-Zehnder interferometer.

30. A measuring apparatus according to claim 24, wherein said interference means is a mirror of a highly accurate shape which is arranged on the back surface of said measuring surface.

31. A measuring apparatus according to claim 24, wherein said interference means is a Michelson's interferometer.

32. A measuring apparatus according to claim 24, wherein said interference means is a Fizeau interferometer.

33. A measuring apparatus according to claim 24, further having means for holding said object to be measured and adjusting the position and/or attitude of said object.

34. A measuring apparatus according to claim 24, wherein said means for providing said interference fringe is an ITV camera.

35. A measuring apparatus according to claim 24, wherein said means for providing said interference fringe is a CCD camera.

36. A measuring apparatus according to claim 24, wherein said means for providing said interference fringe is an image dissector camera.

37. A measuring apparatus according to claim 24, wherein said means for providing said interference fringe is a photo array sensor.

38. A method of measuring a shape of an object to be measured comprising the steps of:
 (a) generating a coherent light beam;
 (b) making a beam of said coherent light beam which is reflected from a reference surface as a reference beam interfere with a beam reflected, as an object beam, from a measuring surface of said measuring object, thereby producing an actual interference fringe;
 (c) changing a phase difference between said object beam and said reflected beam to N stages by $\psi$ at a time and storing an actual image signal at each of said N stages (N is an integer of 2 or more);
 (d) obtaining virtual interference fringes which are obtained in the case where it is assumed that said measuring surface has ideal design forming values and that a phase difference between a virtual object beam and a virtual reference beam is changed in N stages by $\psi$ at a time; and
 (e) measuring the forming error of said measuring surface on the basis of said actual interference fringe and said virtual interference fringe, said measuring step including the following procedures:

storing a virtual image signal at each stage of the change of the phase differences of said N stages when obtaining said virtual interference fringe, sequentilally reading said virtual image signal at each stored stage, performing said change of said phase difference between said object beam and said reference beam in synchronism with said sequential reading, calculating a product of said virtual image signal read out and said actual image signal, and display an image on the basis of the result of said calculation and measuring the forming error of said measuring surface of said object to be measured from a linearity of said image.

39. A methed of measuring a shape of an object to be measured comprising the steps of:
(a) generating a coherent light beam;
(b) making a beam of said coherent light beam which is reflected from a reference surface as a reference beam interfere with a beam reflected, as an object beam, from a measuring surface of said measuring object, thereby producing an actual interference fringe;
(c) changing a phase difference between said object beam and said reflected beam to N stages by $\psi$ at a time and storing an actual image signal at each of said N stage (N is an integer of 2 or more);
(d) obtaining virtual inerference fringes which are obtained in the case where it is assumed that said measuring surface has ideal design forming values and that a phase difference between a virtual object beam and a virtual reference beam is changed in N stages by $\psi$ at a time; and
(e) measuring the forming error of said measuring surface on the basis of said actual interference fringe and said virtual interference fringe, said measuring step including the following procedures:
storing a virtual image signal at each stage of the change of the phase differneces of said N stages when obtaining said virtual interference fringe,
sequentially reading said virtual image signal at each stored stage,
performing said change of said phase difference between said object beam and said reference beam in synchronism with said sequential reading,
calculating a difference of said virtual image signal read out and said actual image signal, and
displaying an image on the basis of the result of said calculation and measuring the forming error of said measuring surface of said object to be measured from a linearity of said image.

40. A method of measuring a shape of an object to be measurued comprising the steps of:
(a) generating a coherent light beam;
(b) making a beam of said coherent light beam which is reflected from a reference surface as a reference beam interfere with a beam reflected, as an object beam, from a measuring surface of said measuring object, thereby producing an actual interference fringe;
(c) changing a phase difference between said object beam and said reflected beam to N stages by $\psi$ at a time and storing an actual image signal at each of said N stages (N is an integer of 2 or more);
(d) obtaining virtual interference fringes which are obtained in the case where it is assumed that said measuring surface has ideal design forming values and that a phase difference between a virtual object beam and a virtual reference beam is changed in N stages by $\psi$ at a time; and
(e) measuring the forming error of said measuring surface on the basis of said actual interference fringe and said virtual interference fringe, said measuring step including the following procedures:
storing a virtual image signal at each stage of the change of the phase differences of said N stages when obtaining said virtual interference fringe,
sequentially reading said virtual image signal at each stored stage,
performing said change of said phase difference between said object beam and said reference beam in synchronism with said sequential reading,
calculating a quotient of said virtual image signal read out and said actual image signal, and
displaying an image on the basis of the result of said calculation and measuring the forming error of said measuring surface of said object to be measured from a linearity of said image.

41. An apparatus for measuring a forming error of an object to be measured comprising:
(a) means for generating a coherent light beam;
(b) reference means;
(c) means for making a beam of said coherent light beam which is reflected from a reference surface of said reference means as a reference beam interfere with a beam reflected, as an object beam, from a measuring surface of said measuring object;
(d) means for providing an actual interference fringe;
(e) arithmetic means for obtaining virtual interference fringes when a phase difference between a virtual object beam from a virtual object and a virtual reference beam is changed in N stages at $\psi$ at a step when it is assumed that said measuring surface has ideal design forming values;
memory means for storing a virtual image signal at each of said N stages of said virtual interference fringes derived by said arithmetic means;
reading means for sequentially reading out the virtual image signal at each of said N stages from said memory means;
driving means for changing a phase of said reflected beam from said reference means by driving the reference means;
means for controlling said driving means so as to change the phase of said reflected beam from said reference beam to N stages by $\psi$ at a time in synchronism with the readout of said virtual image signal by said reading means;
signal processing means for calculating a product of said virtual image singal and said readout means and the image signal of said actual interference fringe; and
means for displaying an image on the basis of an output from said signal processing means and measuring the forming errors of said measuring surface of said object to be measured form a lineraity of said image displayed.

42. An apparatus for measuring a forming error of an object to be measured comprising:
(a) means for generating a coherent light beam;
(b) reference means;
(c) means for making a beam of said coherent light beam which is reflected from a reference surface of said reference means as a reference beam interfere with a beam reflected, as an object beam, from a measuring surface of said measuring oblect;
(d) means for providing an actual interference fringe;
(e) arithmetic means for obtaining virtual interference fringes when a phase difference between a virtual object beam from a virtual object and a virtual reference beam is changed in N stages at $\psi$ at a step when it is assumed that said measuring surface has ideal design forming values;
memory means for storing a virtual image signal at each of said N states of said virtual interference fringes derived by said arithmetic means;
reading means for sequentially reading out the virtual image signal at each of said N stages from said memory means;

driving means for changing a phase of said reflected beam from said reference means by driving the reference means;

means for controlling said driving means so as to change the phase of said reflected beam from said reference beam to N stages by ψ at a time in synchronism with the readout of said virtual image signal by said reading means;

signal processing means for calculating a difference of said virtual image signal and said readout means and the image signal of said actual interference fringe; and means for displaying an image on the basis of an output from said signal processing means and measuring the forming errors of said measuring surface of said object to be measured from a linearity of said image displayed.

43. An apparatus for measuring a forming error of an object to be measured comprising:
(a) means for generating a coherent light beam;
(b) reference means;
(c) means for making a beam of said coherent light beam which is reflected from a reference surface of said reference means as a reference beam interfere with a beam reflected, as an object beam, from a measuring surface of said measuring object;
(d) means for providing an acutal interference fringe;
(e) arithmetic means for obtaining virtual interference fringes when a phase difference between a virtual object beam from a virtual object and a virtual reference beam is changed in N stages at ψ at a step when it is assumed that said measuring surface has ideal design forming values memory means for storing a virtual image signal at each of said N stages of said N stages of said virtual interference fringes derived by said arithmetic means;

reading means for sequentially reading out the virtual image signal at each of said N stages from said memory means;

driving means for changing a phase of said reflected beam from said reference means by driving the reference means;

means for controlling said driving means so as to change the phase of said reflected beam from said reference beam to N stages by ψ at a time in synchronism with the readout of said virtual image signal by said reading means;

signal processing means for calculating a quotient of said virtual image signal and said interference fringe; the image signal of said actual interference fringe; and means for displaying an image on the basis ofan output from said signal processing means and measuring the forming errors of said measuring surface of said object to be measured from a linearity of said image displayed.

* * * * *